(12) United States Patent
Gosala et al.

(10) Patent No.: US 11,774,575 B2
(45) Date of Patent: Oct. 3, 2023

(54) EXTENDED OBJECT TRACKING USING RADAR

(71) Applicant: Motional AD LLC, Boston, MA (US)

(72) Inventors: Nikhil Bharadwaj Gosala, Zürich (CH); Xiaoli Meng, Singapore (SG)

(73) Assignee: Motional AD LLC, Boston, MA (US)

(*) Notice: Subject to any disclaimer, the term of this patent is extended or adjusted under 35 U.S.C. 154(b) by 362 days.

(21) Appl. No.: 17/019,157

(22) Filed: Sep. 11, 2020

(65) Prior Publication Data

US 2021/0080558 A1  Mar. 18, 2021

Related U.S. Application Data

(60) Provisional application No. 62/900,358, filed on Sep. 13, 2019.

(51) Int. Cl.
*G01S 13/72* (2006.01)
*G01S 13/42* (2006.01)
(Continued)

(52) U.S. Cl.
CPC ............ *G01S 13/723* (2013.01); *G01S 7/415* (2013.01); *G01S 13/42* (2013.01); *G01S 13/589* (2013.01); *G01S 13/931* (2013.01)

(58) Field of Classification Search
CPC ........ G01S 13/723; G01S 7/415; G01S 13/42; G01S 13/589; G01S 13/931;
(Continued)

(56) References Cited

U.S. PATENT DOCUMENTS

| 5,638,281 | A | * | 6/1997 | Wang | ................ G01S 7/021 |
| | | | | | 342/29 |
| 2007/0008210 | A1 | | 1/2007 | Kibayashi et al. | |

(Continued)

FOREIGN PATENT DOCUMENTS

| CN | 107341819 | 11/2017 |
| CN | 110361727 | 10/2019 |

(Continued)

OTHER PUBLICATIONS

Wikipedia: Kalman Filter (accessed Feb. 17, 2023) (Year: 2018).*
(Continued)

*Primary Examiner* — Donald H B Braswell
(74) *Attorney, Agent, or Firm* — Fish & Richardson P.C.

(57) ABSTRACT

Techniques are provided for extended object tracking using RADAR return points only. The techniques include receiving the return points from at least one RADAR sensor of the vehicle. One or more clusters based on or from the return points are generated. An estimated position and velocity of each of the one or more clusters is computed. A Recursive Least Squares (RLS) based algorithm is proposed to estimate the instantaneous velocity of a cluster in real-time that allows for accurate track-cluster association, removes the need to perform computationally expensive non-linear state updates, and allows for the estimation of the true velocity even in frames with a large amount of clutter. If it is determined that the one or more clusters are associated with an existing object track, the existing object track is updated using at least the respective positions of the one or more clusters associated with the existing object track.

20 Claims, 19 Drawing Sheets

(51) Int. Cl.
G01S 13/58 (2006.01)
G01S 7/41 (2006.01)
G01S 13/931 (2020.01)

(58) Field of Classification Search
CPC ........ G01S 13/726; G01S 17/66; G01S 13/52; G01S 13/66; G01S 13/72; G01S 7/41; G01S 13/582
See application file for complete search history.

(56) References Cited

U.S. PATENT DOCUMENTS

| | | | |
|---|---|---|---|
| 2017/0242125 A1* | 8/2017 | Suzuki | G01S 17/42 |
| 2018/0120429 A1 | 5/2018 | Bialer | |
| 2018/0306912 A1 | 10/2018 | Branson | |
| 2019/0107615 A1 | 4/2019 | Eljarat et al. | |
| 2019/0146081 A1 | 5/2019 | Bikil et al. | |
| 2019/0162837 A1* | 5/2019 | Komori | G06V 20/58 |
| 2019/0258878 A1* | 8/2019 | Koivisto | G06N 20/00 |
| 2020/0003907 A1* | 1/2020 | Eriksson | G05D 1/0214 |
| 2020/0386883 A1* | 12/2020 | Hofmann | G01S 13/931 |
| 2021/0003687 A1* | 1/2021 | Nishida | G01S 13/06 |

FOREIGN PATENT DOCUMENTS

| | | |
|---|---|---|
| EP | 2690458 | 1/2014 |
| GB | 2510877 | 8/2014 |
| JP | 2019070566 | 5/2019 |
| JP | 2019200083 | 11/2019 |
| KR | 10-2019-0074293 | 6/2019 |
| WO | WO 2017167387 | 10/2017 |
| WO | WO 2019/161300 | 8/2019 |
| WO | WO 2019220503 | 11/2019 |

OTHER PUBLICATIONS

Granstrom et al., "Extended object tracking: Introduction, overview and applications," arXiv preprint arXiv:1604.00970, Mar. 14, 2016, 30 pages.

Wagner et al., "Modification of DBSCAN and application to range/Doppler/DoA measurements for pedestrian recognition with an automotive radar system," European Radar Conference (EuRAD), Sep. 9-11, 2015, 269-72.

[No Author Listed] "SAE: Surface Vehicle Recommended Practice, Taxonomy and Definitions for Terms Related to Driving Automation Systems for On-Road Motor Vehicles" SAE International, Sep. 30, 2016, 30 pages.

Gosala et al., "Extended Radar Tracker based on the Estimation of Instantaneous Velocity for Dynamic Objects," International Conference on Intelligent Robots and Systems, Feb. 24, 2020, 8 pages.

Lundquist et al., "An Extended Target CPHD Filter and a Gamma Gaussian Inverse Wishart Implementation," IEEE Journal of Selected Topics in Signal Processing, 7: 472-483.

Mahler, "Multitarget Bayes filtering via first-order multitarget moments," IEEE Transactions on Aerospace and Electronic Systems, 39:1152-1178.

Dwivedi et al., "Fast block LMS and RLS-based parameter estimation and two-dimensional imaging in monostatic MIMO RADAR systems with multiple mobile targets," IEEE Transactions on Signal Processing, Jan. 22, 2018, 66(7):1775-90.

Adam et al., "Radar-based extended object tracking under clutter using generalized probabilistic data association," 16th International IEEE Conference on Intelligent Transportation Systems (ITSC 2013), The Hague, Netherlands, Oct. 6-9, 2013, pp. 1408-1415.

Hammarstrand et al., "Extended object tracking using a radar resolution model," IEEE Transactions on Aerospace and Electronic Systems, 2012, 48(3):2371-2386.

MathWorks.com [online], "Extended Object Tracking of Highway Vehicles with Radar and Camera," available on or before Sep. 2019, retrieved on Jul. 5, 2023, retrieved from URL <https://www.mathworks.com/help/driving/examples/extended-object-tracking.html>, 16 pages.

Scheel et al., "Tracking Multiple Vehicles Using a Variational Radar Model," revised Oct. 26, 2019, arXiv:1711.03799, 15 pages.

Yang et al., "Second-order extended Kalman filter for extended object and group tracking," 2016 19th International Conference on Information Fusion (FUSION), Heidelberg, Germany, 2016; arXiv:1604.00219v2, May 25, 2018, 11 pages.

* cited by examiner

EXTENDED OBJECT TRACKING USING RADAR

CROSS-REFERENCE TO RELATED APPLICATION

This application claims priority to U.S. Provisional Patent Application No. 62/900,358, filed Sep. 13, 2019, the entire contents of which are incorporated herein by reference.

FIELD OF THE INVENTION

This description relates generally to operation of vehicles and specifically to object tracking.

BACKGROUND

Extended Object Tracking (EOT) refers to tracking real-world objects when there is more than one return point per object. With the advent and use of high-resolution sensors in automotive applications to detect objects, multiple return points per object are common. Multiple return points per object allow an inference to be made about the shape and size of the object and its motion state (e.g., position, velocity and heading). EOT groups multiple return points together, drawing a bounding box around the grouped return points and tracking the return points or a mass of return points over time. Some challenges of existing EOT solutions include but are not limited to: 1) grouping return points from the same object together and not grouping return points belonging to different objects; 2) associating new return points to existing tracks; 3) updating existing track(s) based on a new set of return points; and 4) detecting and rejecting return points that are noise.

SUMMARY

Techniques are provided for extended object tracking using RADAR return points only. These techniques include: receiving, using one or more processors of a vehicle, return points from at least one RADAR sensor of the vehicle; generating, using the one or more processors, one or more clusters of the return points; computing, using the one or more processors, an estimated position and velocity of each of the one or more clusters; determining, using the one or more processors, if the one or more clusters are associated with an existing object track; and in accordance with the one or more clusters being associated with an existing object track, updating the existing object track using at least the respective positions of the one or more clusters associated to the existing object track.

In an embodiment, the return points that are more than a threshold distance from a prior map feature, such as a road boundary are filtered out.

In an embodiment, the return points that have ergo-motion compensated range rates less than a threshold range rate are filtered out.

In an embodiment, prior to generating the one or more clusters, return points for multiple RADAR time-steps or frames are accumulated to increase the point density of the RADAR point cloud.

In an embodiment, generating the one or more clusters of the return points comprises clustering the return points using density-based, spatial clustering, such as DBSCAN.

In an embodiment, the density-based, spatial clustering uses an elliptical region around the return points to expand the one or more clusters, and the elliptical region has a major axis that is parallel to traffic flow.

In an embodiment, after generating the one or more clusters, a length, width and center of each cluster is computed, wherein the center is a representative position of the cluster and all return points belonging to the cluster are assumed to be concentrated at the center.

In an embodiment, the center is determined using a bounding box that is fit around the cluster using the extreme points of the cluster.

In an embodiment, a heading for each of the one or more clusters is computed using the respective velocities of the each of the one or more clusters.

In an embodiment, the length is defined as a maximum distance between the return points in a direction of the heading.

In an embodiment, the width is defined as a maximum distance between the return points that are perpendicular to the heading.

In an embodiment, the return points are aligned to an axis of a global reference frame prior to computing the length, width and center.

In an embodiment, determining if each of the one or more clusters is associated with an existing object track by computing differences between the respective estimated positions and velocities of the one or more clusters and a predicted position and velocity of the existing object track, and determining if the differences are below respective threshold values for the position and velocity.

In an embodiment, computing the estimated velocity of each of the one or more clusters further comprises estimating the velocity of the cluster using one or more recursive least squares (RLS) filters.

In an embodiment, comparing the updated estimated velocity of the each of the one or more clusters to a threshold velocity, and if the updated estimated velocity exceeds the threshold velocity, filtering the return point that caused the updated estimated velocity to exceed the threshold velocity.

In an embodiment, an ensemble of RLS filters are used to estimate cluster velocities, where the velocity of each RLS filter is initialized using the velocity calculated from a cluster accumulation history, which is obtained by estimating how much the return points have moved divided by the time difference between the time-steps or frames. Also, the return points in the clusters are shuffled to be in different random orders to update the ensemble of RLS filters.

In an embodiment, if two or more clusters are associated with the existing object track, return points from the two or more clusters are assimilated into a single, larger cluster and the estimated position and velocity of the single, larger cluster is computed.

In an embodiment, if the one or more clusters are not associated to an existing object track, a new object track is initialized with the cluster's position, velocity, and the length and width of the track are assigned to pre-defined values.

In an embodiment, the state of the existing object track is maintained and updated using a Kalman Filter, and the state includes the estimated position, velocity, length and width of the object being tracked.

In an embodiment, the Kalman Filter is a linear Kalman Filter that employs a constant velocity motion model for model prediction.

In an embodiment, the estimated velocity of the cluster is used to update the velocity state of the Kalman Filter.

In an embodiment, if the existing object track is not associated with a cluster for N iterations, the existing object track is terminated (e.g., erased from memory).

One or more of the disclosed embodiments provide one or more of the following advantages. The EOT embodiments: 1) provide accurate computation of the extents (length and width) of the objects in addition to their position and velocity; 2) achieve better tracking for long objects like trucks and buses that may be associated with multiple clusters; 3) achieve better tracking of objects that are turning; 4) have reduced reliance on the accuracy of the clustering algorithm; and 5) provide accurate instantaneous velocity estimates which reduce the computation for track management because a LKF is used instead of its non-linear counterpart.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
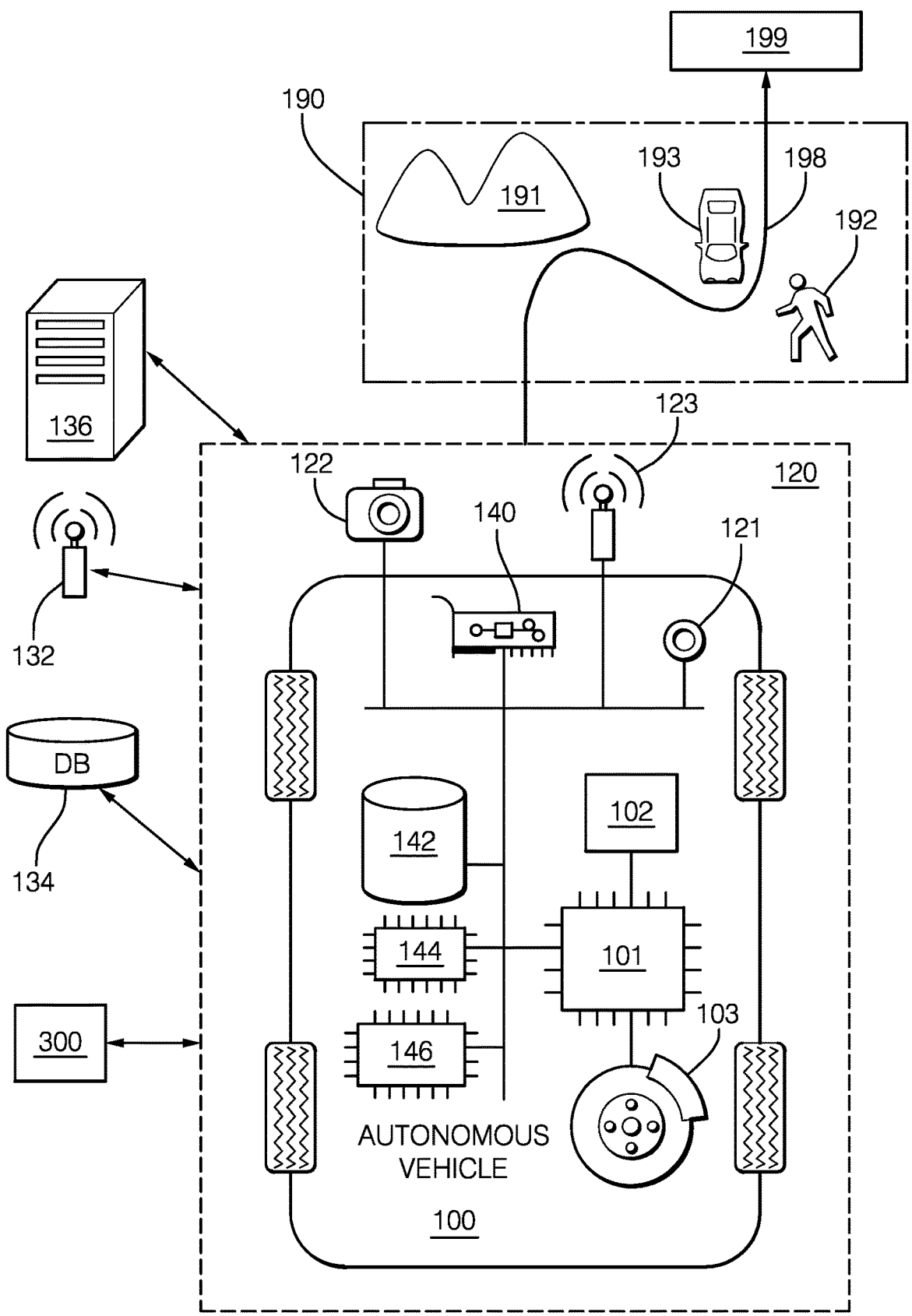
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:
1. General Overview
2. System Overview
3. Autonomous Vehicle Architecture
4. Autonomous Vehicle Inputs
5. Autonomous Vehicle Planning
6. Autonomous Vehicle Control
7. Extended Object Tracking Using RADAR Only General Overview An autonomous vehicle (AV) uses RADAR sensors only to detect and track objects and distances from the objects in its operating environment to avoid collisions with the objects. The Extended Object Tracking (EOT) technology disclosed herein estimates the length and width of objects in addition to the position and velocity of the objects. The EOT is implemented using a processing pipeline that is broadly classified into four parts: 1) pre-processing, 2) clustering, 3) cluster velocity estimation and 4) cluster-track association and track management.

The preprocessing part includes two subparts: static point removal and point cloud accumulation. In the former phase, only moving RADAR return points (hereinafter also referred to simply as "points") are retained and the rest of the points are discarded. This is done to filter out noise points and other indiscernible points from the RADAR point cloud. This filtration, however, also removes non-noise points with a compensated range rate less than the pre-defined range rate threshold, but this omission of non-points does not affect the performance of the tracker. Furthermore, because the RADAR point cloud is extremely sparse, the detection and tracking of objects from one time-step or RADAR frame is challenging. To avoid sparse detections, the density of the RADAR point cloud is increased by accumulating points over multiple time-steps/frames (e.g., 3 time-steps/frames). Accumulating points over multiple time-steps/frames makes detection and tracking of objects easier and provides a good prior for estimating the instantaneous velocity of the objects.

In the second part of the pipeline, the points from the accumulated RADAR point cloud are clustered using a clustering algorithm. In an embodiment, the clustering algorithm is a density-based, clustering algorithm that groups together points that are close to each other based on a distance metric (e.g., Euclidian distance metric), and marks the points that lie in low density regions as outliers. An example density-based, clustering algorithm is the DBSCAN clustering algorithm which adapts to varying cluster shapes and handles outliers and other noise points efficiently. In an embodiment, DBSCAN is modified so that points that are within an elliptical region whose major axis is aligned with the flow of traffic are grouped together. The flow of traffic can be obtained from an annotated prior map. When the flow of traffic is unclear (e.g., in intersections), circular regions are used to group points together.

In a third part of the pipeline, the center and velocity of each cluster is determined. The center of the cluster is assumed to be the geometric center of all the points in the cluster. The geometric center is obtained by computing the center of the tightest possible rectangular bounding box around all the points in the cluster. The position innovation is then the squared distance between the predicted position of the track and the computed position of the cluster.

Unlike position that is directly obtained from the RADAR sensor, the velocity of the cluster is explicitly computed using other outputs of the sensor. For example, a typical RADAR sensor provides a range rate and a bearing of the point with respect to the sensor in addition to its position. Range rate defines the rate at which a point is coming towards or moving away from the sensor, and bearing refers to the angle between the ray extending perpendicularly outwards from the sensor and a line pointing directly at the target. Assuming that all points on the object have identical velocity vectors, i.e. all objects in the world are rigid, the velocity of the cluster can be computed by solving a system of linear equations. A solution to the system of linear equations is obtained when there are more than two distinct points in the cluster.

In an embodiment, a Recursive Least Squares (RLS) filter is used to estimate the velocity of the cluster. The RLS filter is an adaptive filter algorithm that recursively updates the parameters to minimize a weighted least squares cost function. The RLS algorithm starts by initializing the estimated cluster velocity using the cluster accumulation history. The algorithm exhibits very fast convergence and is computationally very fast because it updates the parameters only using the state vector and the new data point. In an embodiment, the initial velocity estimate is computed from the cluster accumulation history. Since the position estimates from the RADAR sensor are accurate, the initial velocity can be estimated by computing the change in position and dividing it by the time between the two frames.

The update step of the RLS algorithm is used to determine whether a point is an outlier and whether its filter update should be used. A point is considered to be an outlier if its update results in a change in velocity that is greater than a pre-defined threshold. To allow for some inaccuracies in initialization, this check is performed after multiple updates of the filter. To account for the case when outliers make the multiple updates resulting in all the correct measurements being classified as outliers, an ensemble of RLS filters (e.g., 10 RLS filters) are initialized with each filter being given a randomized order of points as input. The filter whose velocity component value results in the smallest re-projected range rate error "wins" and its velocity is considered to be the velocity of the cluster.

Once the center and velocity of the clusters is computed, the fourth part of the pipeline ascertains whether any of the newly computed clusters are return points from objects that are already being tracked by the object tracker. This fourth part is not trivial because it is not known which return points come from which object(s) and vice-versa. In an embodiment, two parameters (e.g., position and the velocity) are used to compute the association between the clusters and the tracks. In an embodiment, a cluster is associated to a track if the innovation between the predicted parameters of the track and the estimated position (center) and velocity of the cluster are less than a predefined threshold, and the sum of the innovations between the two parameters is the least among all potential tracks.

In an embodiment, a track state is maintained using a 6-dimensional state vector that keeps track of at least, but not limited to, position, velocity, and extents. For example, the track is maintained using a Linear Kalman Filter (LKF) or Unscented Kalman Filter (UKF) with the prediction step using any desirable motion model, such as, for example, a constant velocity motion model or a Constant Turn Rate and Velocity (CTRV) model, which includes heading, speed and bearing angle. A LKF is preferred because all the state parameters can be updated in a linear fashion directly from the raw or derived RADAR measurements. In some embodiments, additional states are estimated such as sensor bias or drift.

When a cluster is not associated to any track, a new track is created with the state parameters initialized using the corresponding values of the cluster. Since the majority of the moving objects on roads are vehicles, the state parameters are initialized with predetermined data. To prevent noise and other random reflections from interfering with the track list, the new track is initially set to an INVALID state, which becomes valid when the track is associated to a cluster for at least N iterations (e.g., 3 iterations).

A cluster is associated to a track when the innovation of both the position and the velocity falls below a pre-defined threshold, and the sum of innovations is the least for that track. Because two or more clusters can be associated to the same track, the first step is to assimilate all the points belonging to one track into a single cluster and re-computing all the parameters of the larger, single cluster. The state update step is then performed using the parameters of this updated, larger cluster.

When an existing track is not associated to any cluster, the track is propagated using the motion model and is flagged to denote that the track had no associations. If the track is consecutively flagged for multiple time-steps/frames (e.g., 6 time-steps/frames), the track is assumed to be stale and is terminated (e.g., deleted from memory).

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are GNSS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
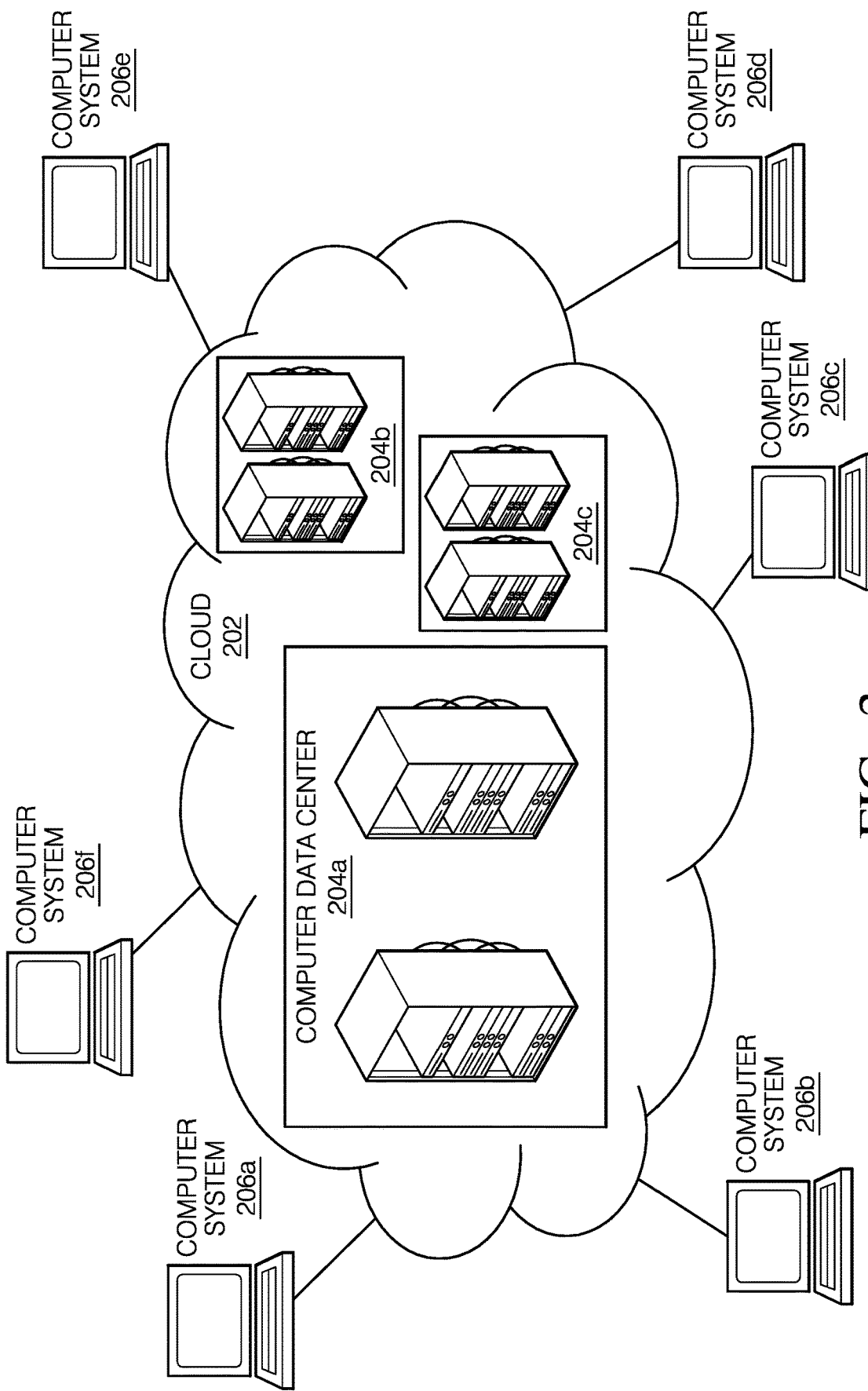
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
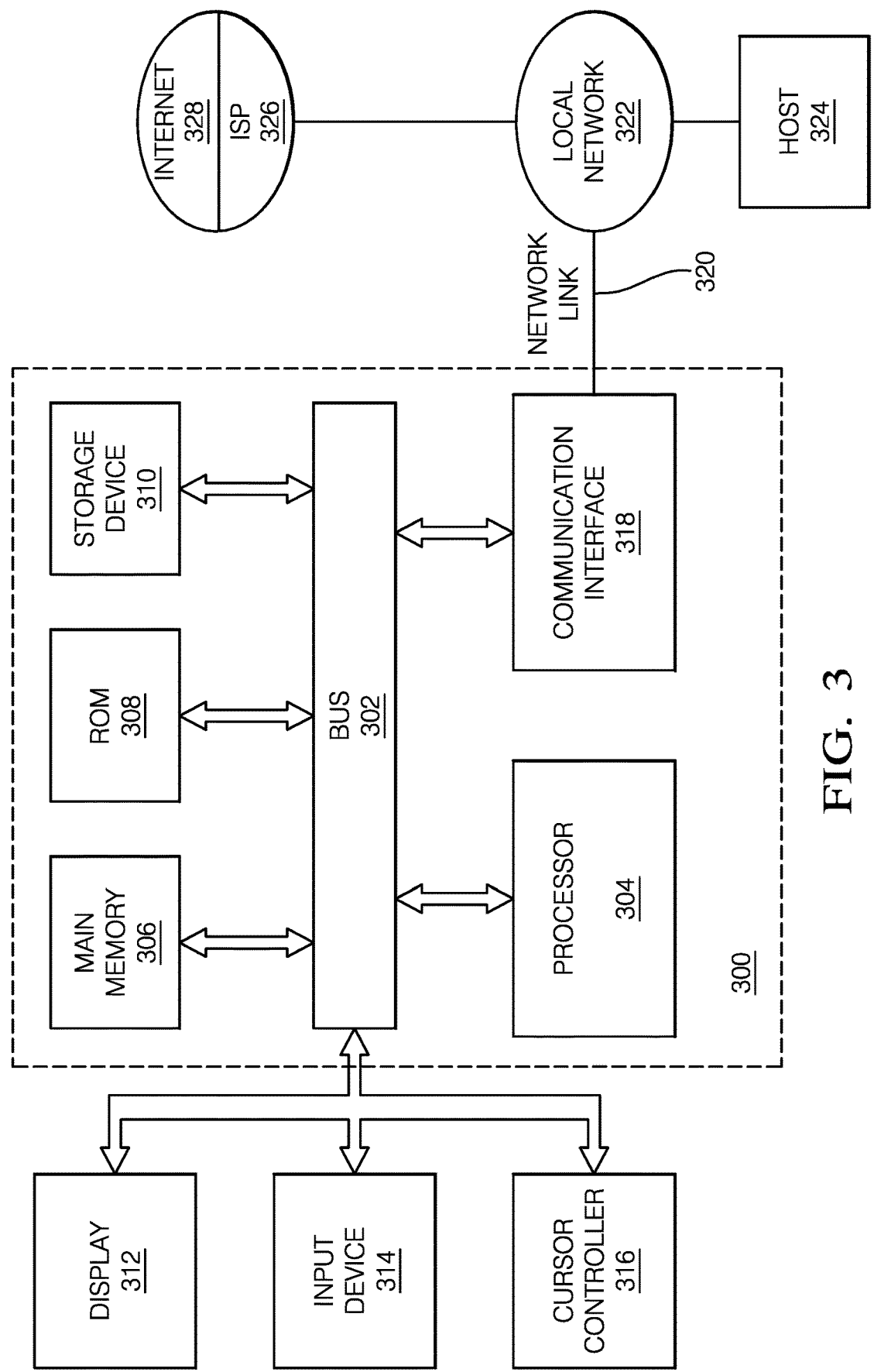
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
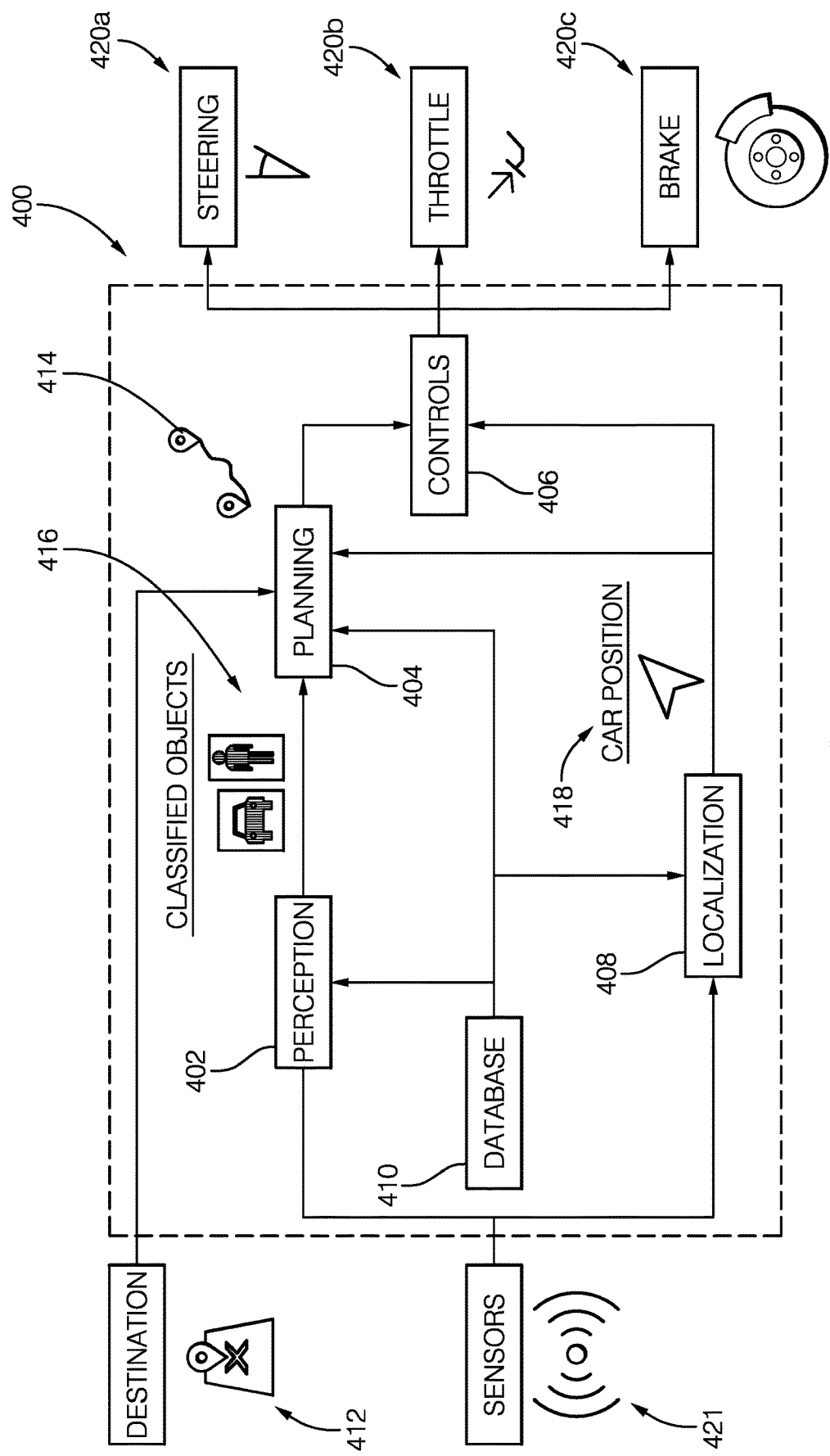
FIG. 4 shows an example architecture for an AV, in accordance with one or more embodiments.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Operation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
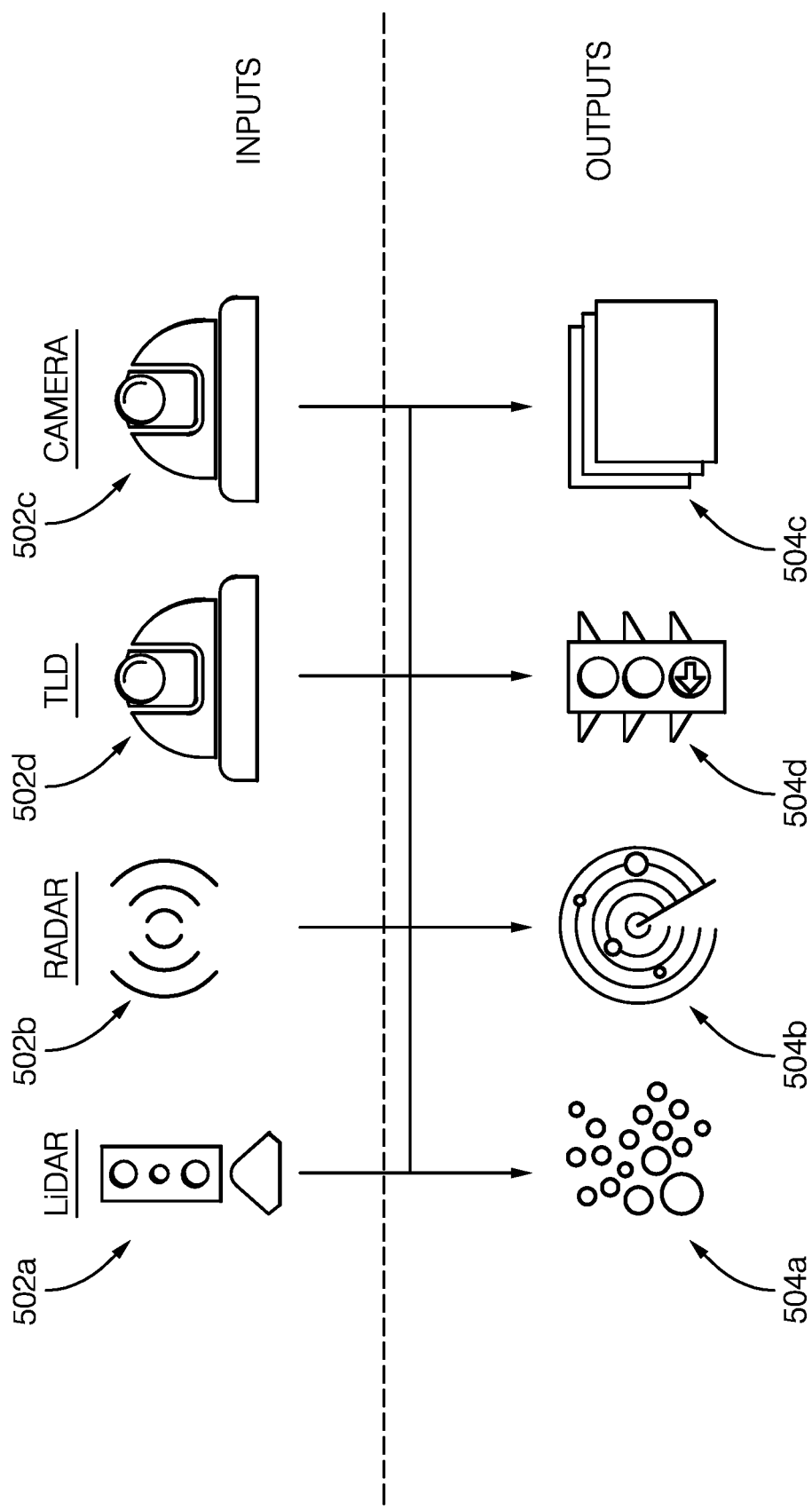
FIG. 5 shows an example of inputs and outputs that may be used by a perception module, in accordance with one or more embodiments.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual operation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual operation information as possible, so that the AV 100 has access to all relevant operation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
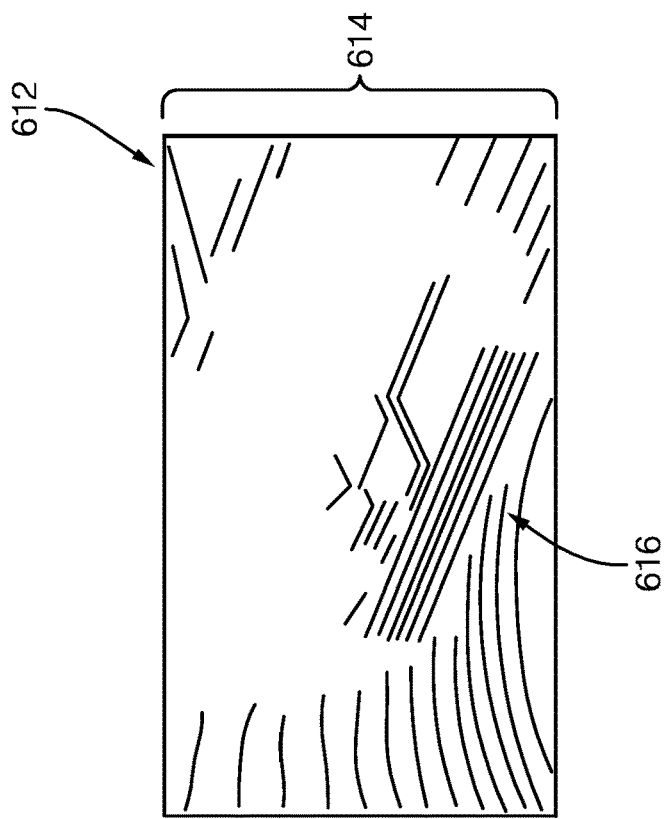
FIG. 6 shows an example of a LiDAR system, in accordance with one or more embodiments.
Figure 6:
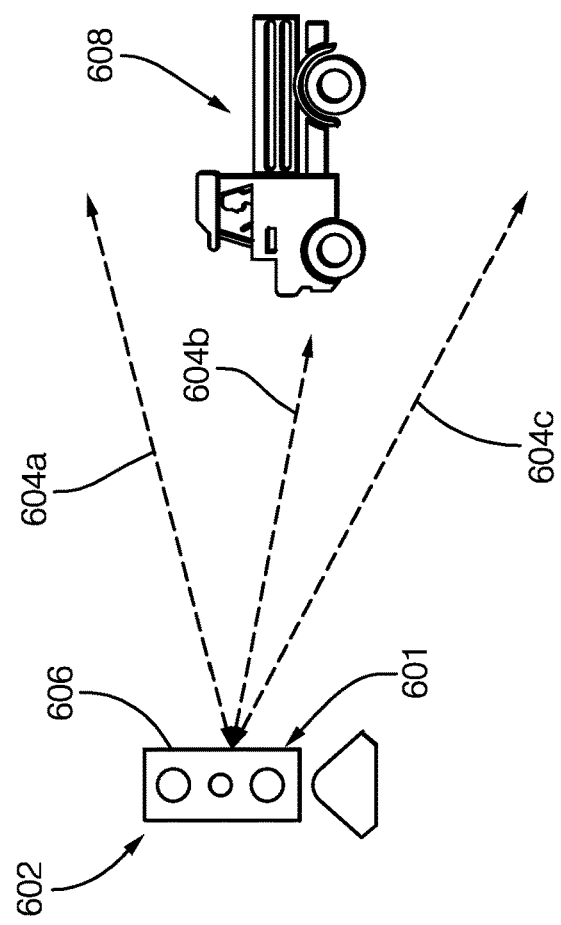

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
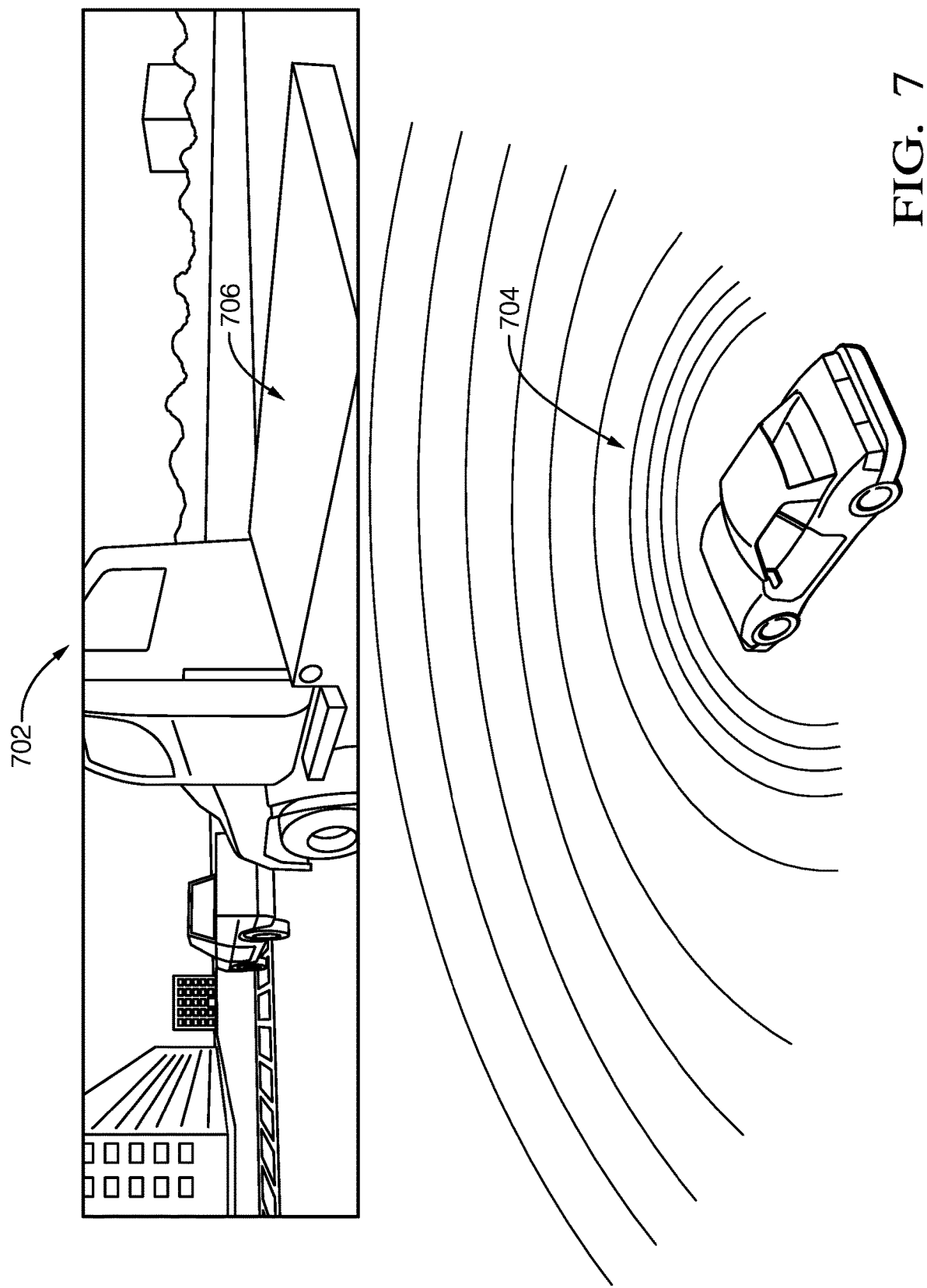
FIG. 7 shows the LiDAR system in operation, in accordance with one or more embodiments.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
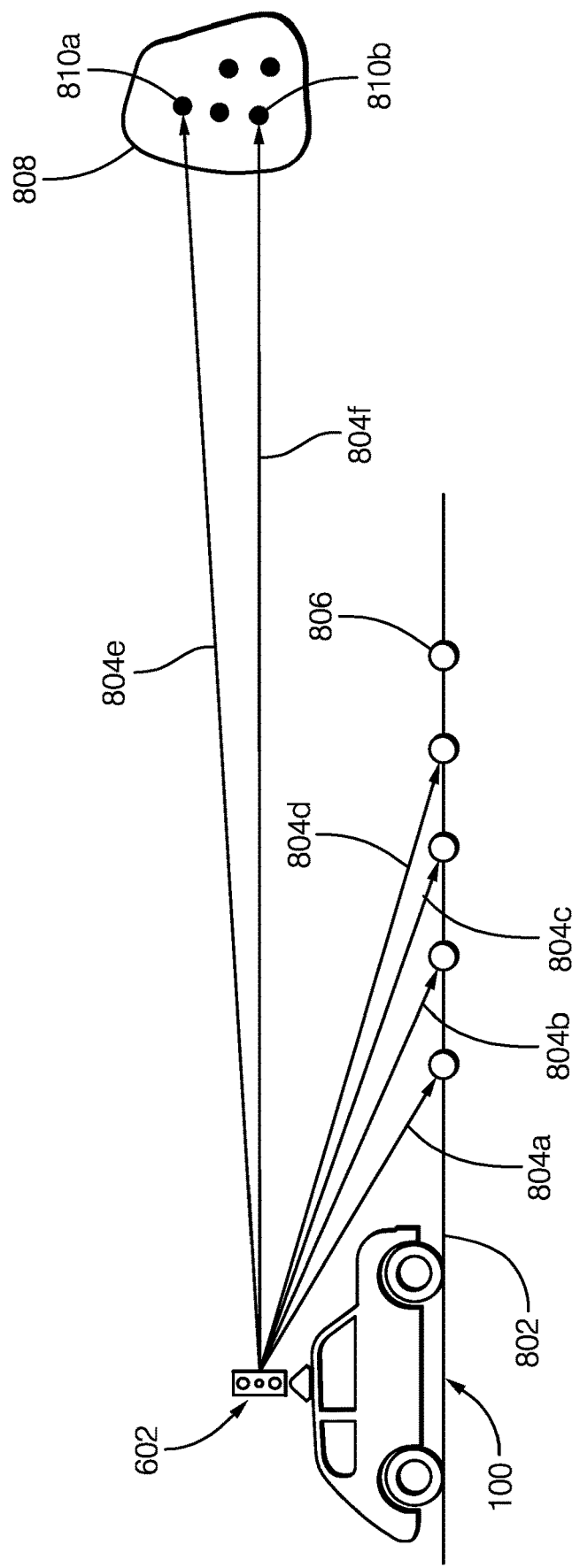
FIG. 8 shows the operation of the LiDAR system in additional detail, in accordance with one or more embodiments.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
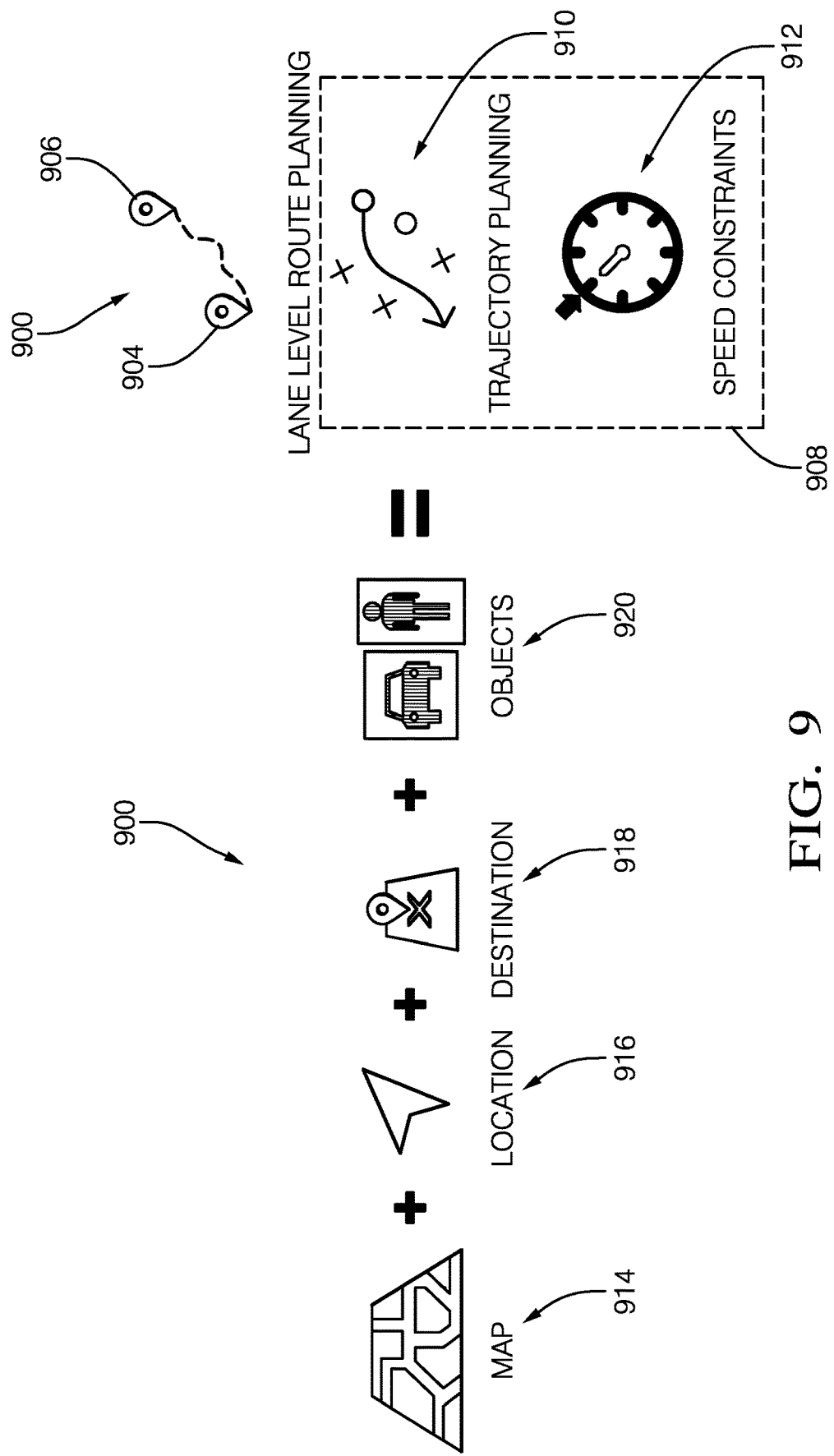
FIG. 9 shows a block diagram of the relationships between inputs and outputs of a planning module, in accordance with one or more embodiments.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
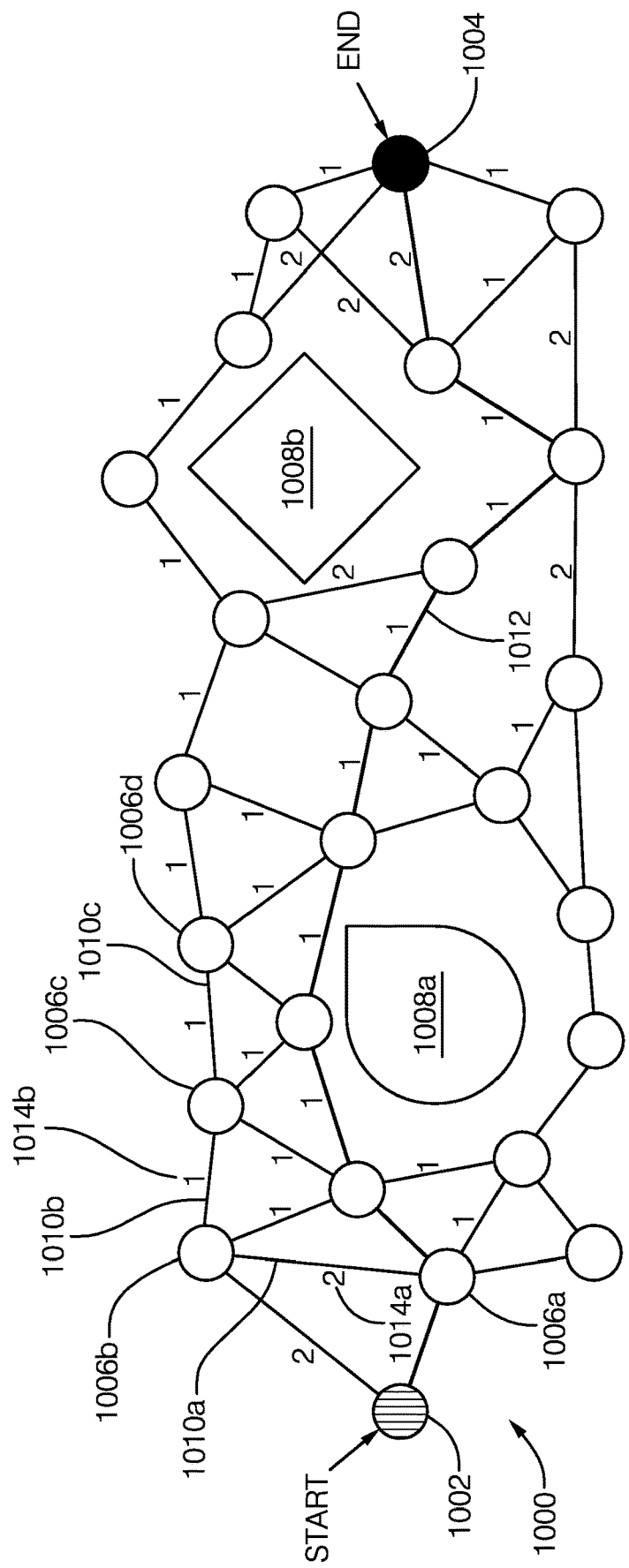
FIG. 10 shows a directed graph used in path planning, in accordance with one or more embodiments.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
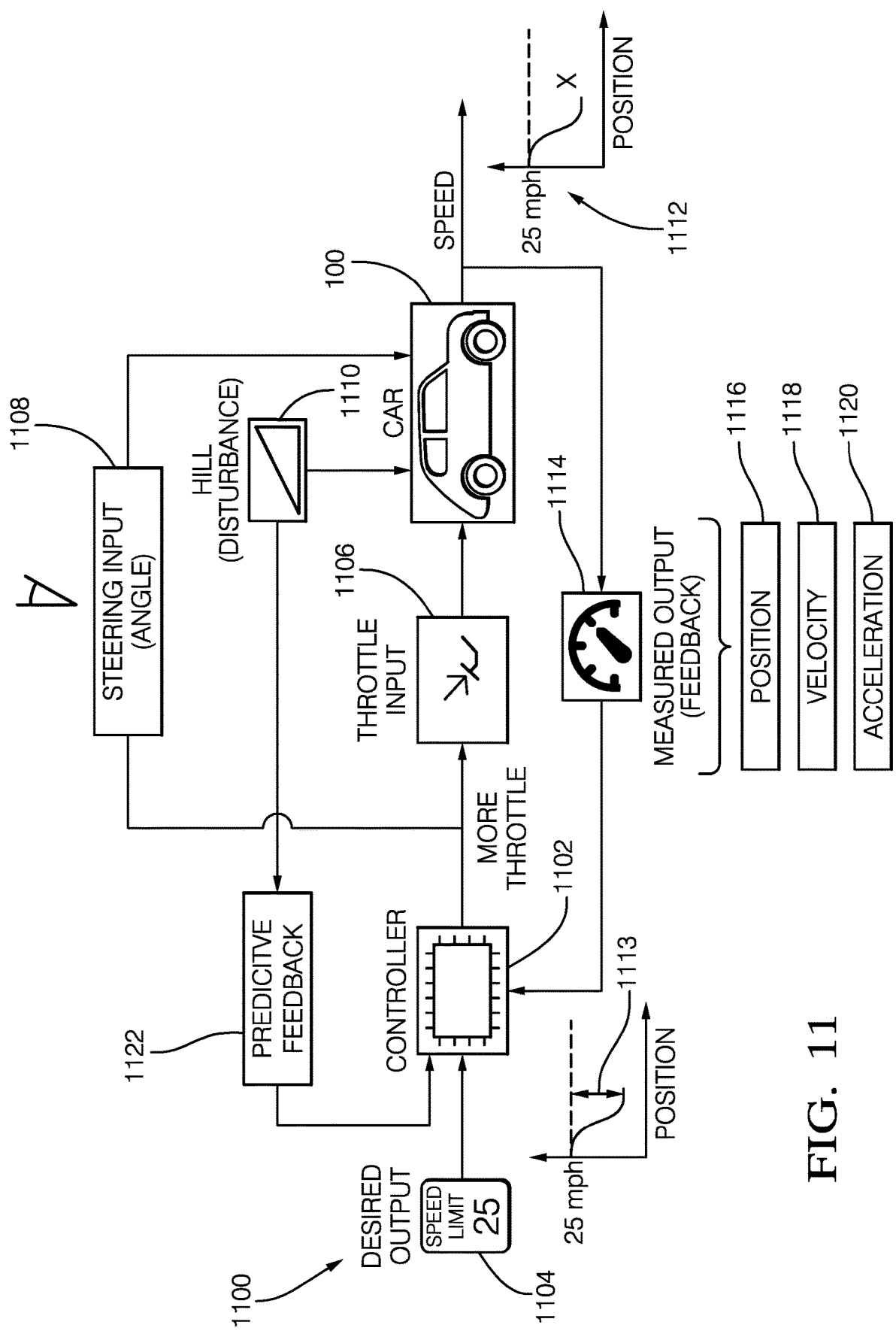
FIG. 11 shows a block diagram of the inputs and outputs of a control module, in accordance with one or more embodiments.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
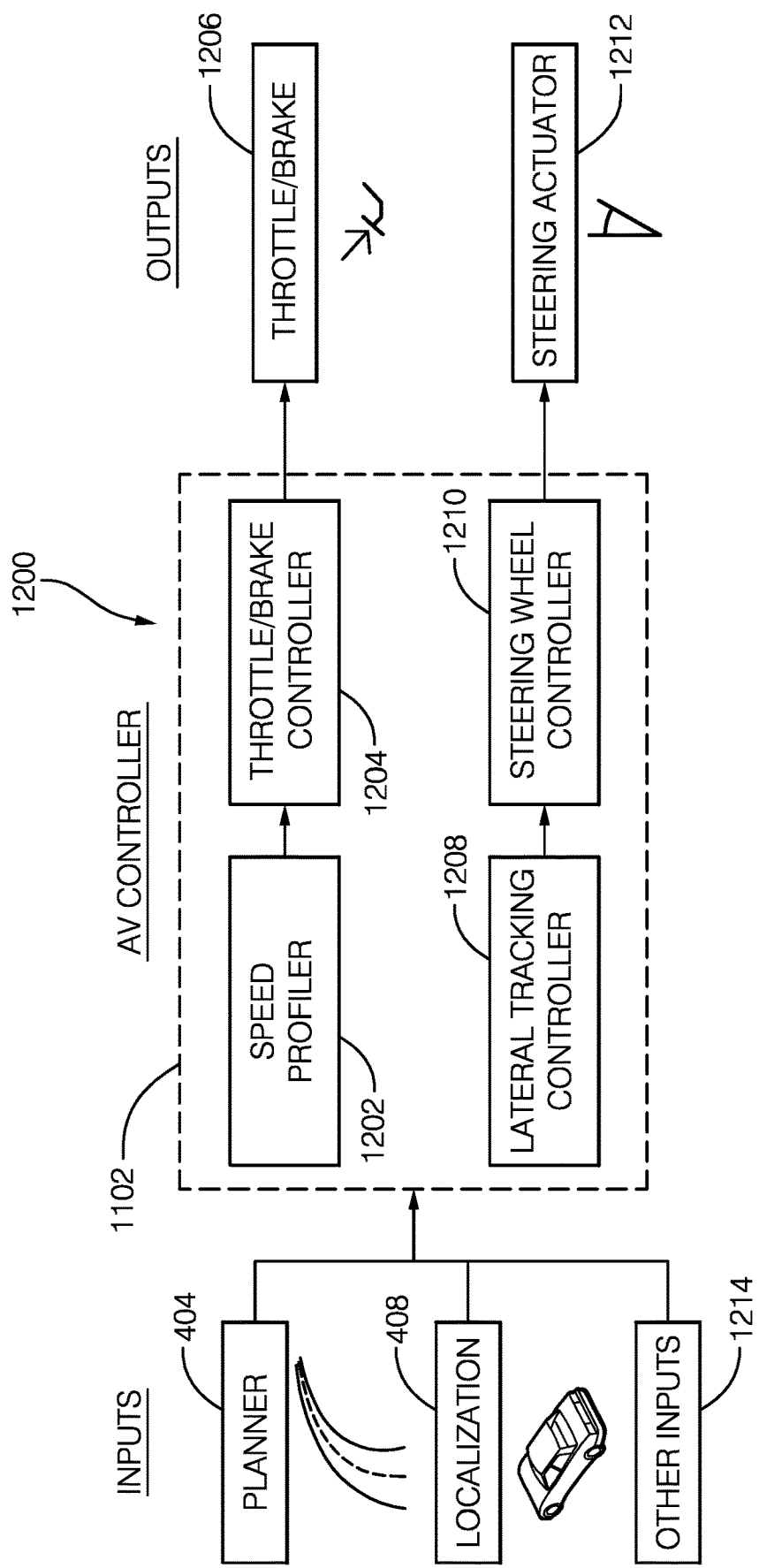
FIG. 12 shows a block diagram of the inputs, outputs, and components of a controller, in accordance with one or more embodiments.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1204 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Extended Object Tracking Using RADAR

I. Pre-Processing

Figure 13A:
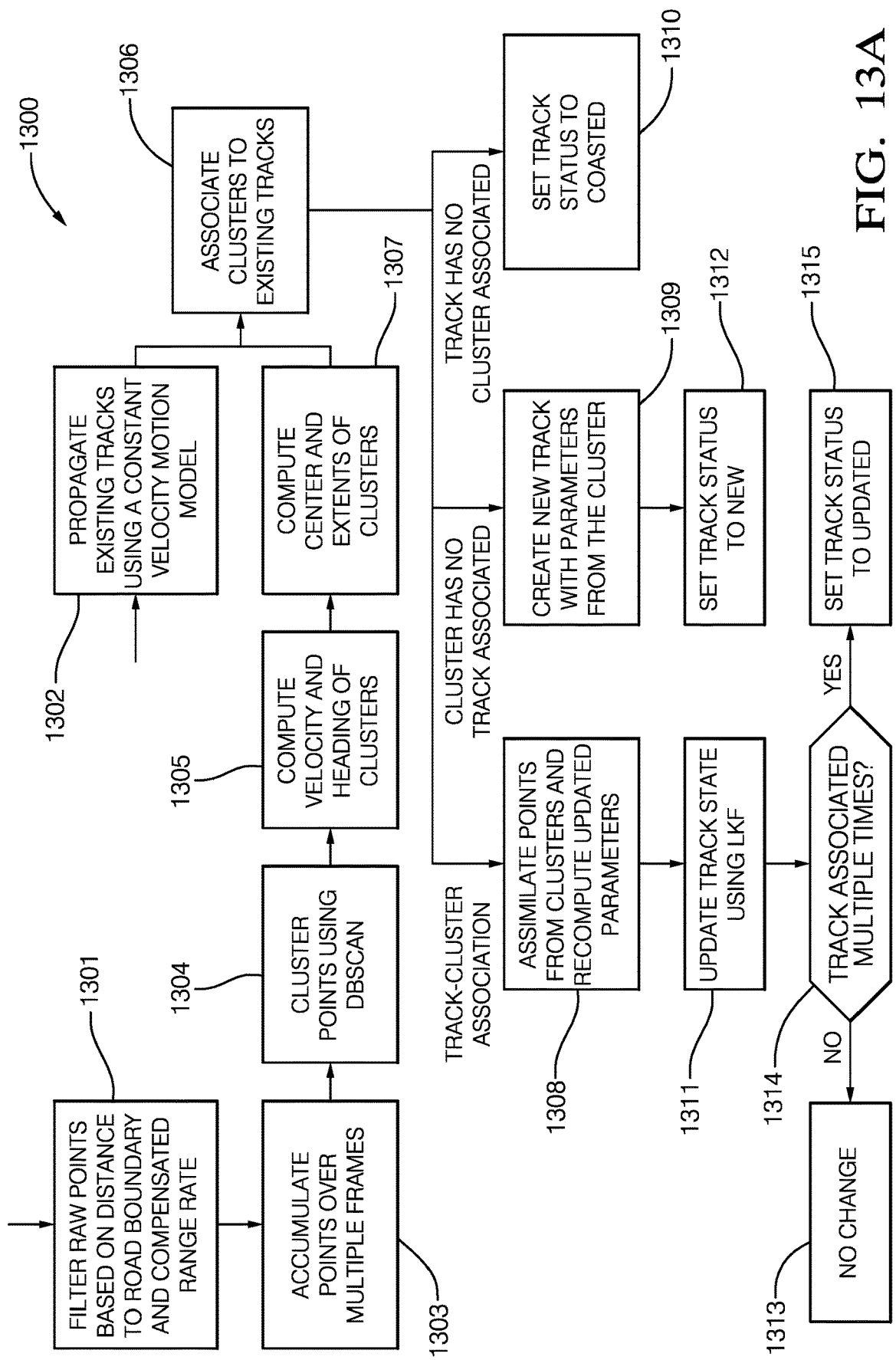
FIG. 13A is a flow diagram of a process for extended object tracking using RADAR, in accordance with one or more embodiments.

FIG. 13A is a flow diagram of a process 1300 for extended object tracking using RADAR, in accordance with one or more embodiments. Process begins by pre-processing the raw RADAR return points (hereinafter also referred to simply as "points") (1301). In this step, all points in the input raw RADAR point cloud farther than a threshold distance from a prior map feature (e.g., a road boundary), and those points with a compensated range rate less than Y meters/second (e.g., 1 m/s), are filtered out and excluded from use in tracking.

Process 1300 continues by accumulating points over multiple time-steps or frames (1302). For example, in an embodiment the filtered points are accumulated for N RADAR time-steps/frames using a rolling buffer or other suitable data structure, where N is a positive integer greater than one. This step implies that whenever points from a new time-step/frame is provided by the RADAR sensor, the set of points from the oldest time-step/frame is replaced with the new set of points for the current or latest time-step/frame. Accumulating points for N time-steps/frames increases the density of the RADAR point cloud by a factor of N and makes the cluster velocity estimation step easier, as described in further detail below. The filtered and accumulated points are then sent to a tracking algorithm for further processing.

II. Clustering

Process 1300 is continued by the tracking algorithm which groups the points into objects using a density-based, clustering algorithm (1303). In an embodiment, the pre-processed points are clustered using the well-known DBSCAN (Density-Based Spatial Clustering of Applications with Noise) algorithm, which groups points based on the Euclidean distance between them. The DBSCAN algorithm starts off with single point clusters which grow in size when there are points in their vicinity. DBSCAN was used because neither the number of objects (cluster centers) nor the number of points per cluster are known in advance. Both the growing of clusters and the classification of points as noisy are governed by two parameters, namely eps and min_elts. A new point becomes part of an existing cluster if it is within eps distance of any point in the cluster, and a cluster is classified as an outlier if it has less than min_elts number of points in it.

DBSCAN expands a cluster if the new point is inside a circle with eps radius (uses a circular regions around points to grow clusters). Since most AVs on the road travel in the direction of traffic flow and are long but not wide, in an embodiment the circle is replaced with an ellipse whose major axis is parallel to the direction of traffic flow. Using the ellipse allows points belonging to the AV to be grouped together and prevents AVs adjacent to each other from being grouped together.

Once all the points have been clustered, cluster-level metrics are computed for each of the clusters, including computing the velocity and heading of the cluster (1304) and computing the center and extents (e.g., length, width) of the cluster (1307). The center of the cluster is the representative position of the cluster and all the points belonging to the cluster are assumed to be concentrated at the center.

In an embodiment, the heading $\theta$ of the cluster is computed using its velocity estimate according to Equation [1]:

$$\theta = \tan^{-1}\frac{v_y}{v_x}. \qquad [1]$$

Since the velocity components $v_x$ and $v_y$ are computed in a global reference coordinate frame, the angle made by a cluster with the X-axis of the global frame (i.e., the heading of the cluster) can be estimated using equation [1]. Because computing the length and width is easier when the points are axis-aligned, all the points in the cluster are aligned to a particular axis (e.g., the X-axis) by rotating each of the points by $-\theta$. The points having the largest and smallest values along the X- and Y-axes are then computed and the length and width of the cluster are computed. The length is defined to be the maximum distance between the points in the direction of heading (implies along the X-axis), and the width is the maximum distance between the points perpendicular to the heading.

Figure 13B:
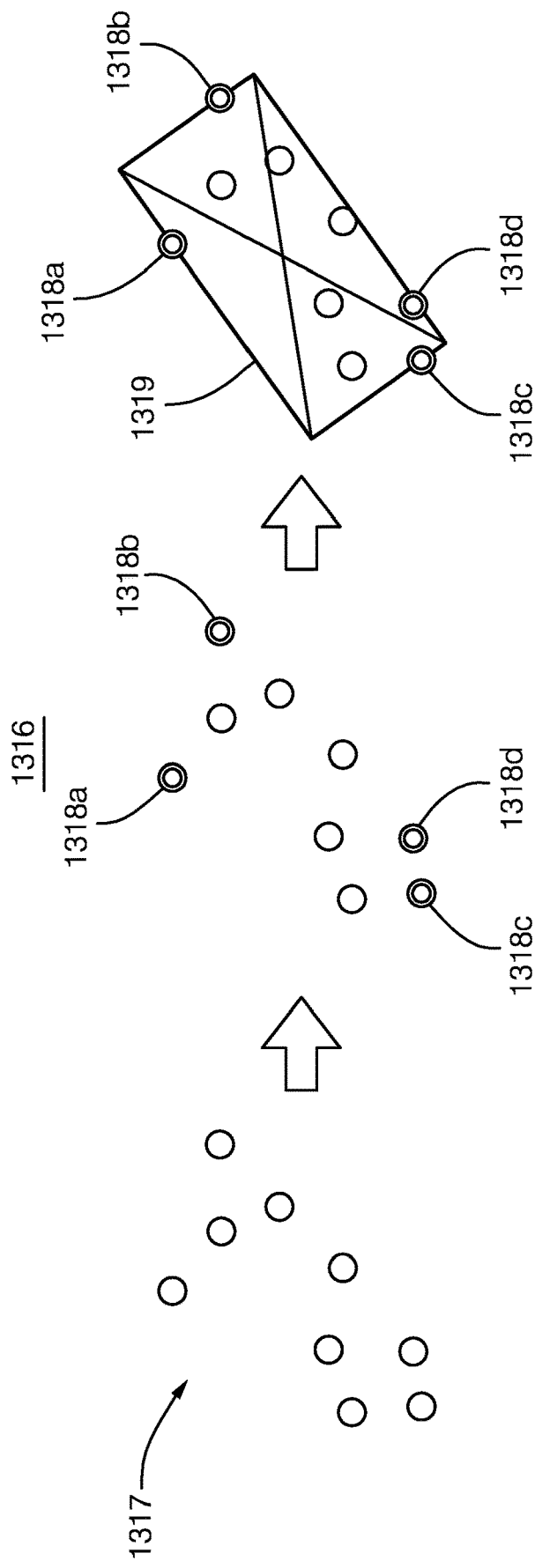
FIG. 13B illustrates the steps involved in estimating the center of a cluster, according to an embodiment.

Referring to FIG. 13B, extreme points 1308a . . . 1308d from the raw cluster of points 1317 are determined, and a rectangular bounding box 1309 is drawn through extreme points 1308a . . . 1308d. The center of the cluster is the geometric center of rectangular bounding box 1319. In an embodiment, the center point coordinates are computed according to Equations [2] and [3]:

$$c_x = \frac{x_{max} - x_{min}}{2}, \qquad [2]$$

$$c_y = \frac{y_{max} - y_{min}}{2}, \qquad [3]$$

where $c_x$ and $c_y$ are the coordinates of the center of the rotated cluster. The center of the cluster is then rotated by an angle $\theta$ and these new rotated coordinates indicate the center of the cluster.

Process 1300 continues by propagating existing object tracks using a constant velocity motion model (1302) and associating the clusters to the existing object tracks (1306). Associating new clusters to existing object tracks is non-trivial because it is not known which point belongs to which object and vice versa. In the case of RADAR, position and velocity are used to associate the clusters computed in a current iteration to the existing object tracks. A cluster is associated to a track if the innovation between the predicted estimated the track and the cluster is the least and innovation of each of the parameters is below a pre-defined threshold. Computing the innovation for the position estimates $I_{pos}$ involves computing the squared distance between the center of the cluster and the position of the track, as shown in Equations [4]:

$$I_{pos} = (x_{track} - x_{cluster})^2 + (y_{track} - y_{cluster})^2 \qquad [4]$$

where $x_{track}$ and $y_{track}$ represent the estimated position of the center of the track, and $x_{cluster}$ and $y_{cluster}$ represent the coordinates of the center of the cluster.

Computing the innovation for the velocity estimates $I_{vel}$ involves computing the squared distance between the cluster velocity and the velocity of the track, as shown in Equation [5]:

$$I_{vel} = (v_x^{track} - v_x^{cluster})^2 + (v_y^{track} - v_y^{cluster})^2 \qquad [5]$$

where $v_x^{track}$, $v_y^{cluster}$, $v_x^{track}$ and $v_y^{cluster}$ represent the axis-aligned velocity of the track and cluster, respectively.

III. Cluster Velocity Estimation

The RADAR sensor gives the position, radial velocity (range rate) and bearing of the point with respect to the RADAR sensor. Given the assumption that all points reflecting off an object move with the same velocity (i.e., all the objects in the world are rigid), the velocity of the cluster is computed by solving a linear system of Equations [6]:

$$v_{r1} = v_x \cos \phi_1 + v_y \sin \phi_1, \qquad [6]$$
$$v_{r2} = v_x \cos \phi_2 + v_y \sin \phi_2,$$
$$\vdots$$
$$v_{rn} = v_x \cos \phi_n + v_y \sin \phi_n.$$

Figure 14:
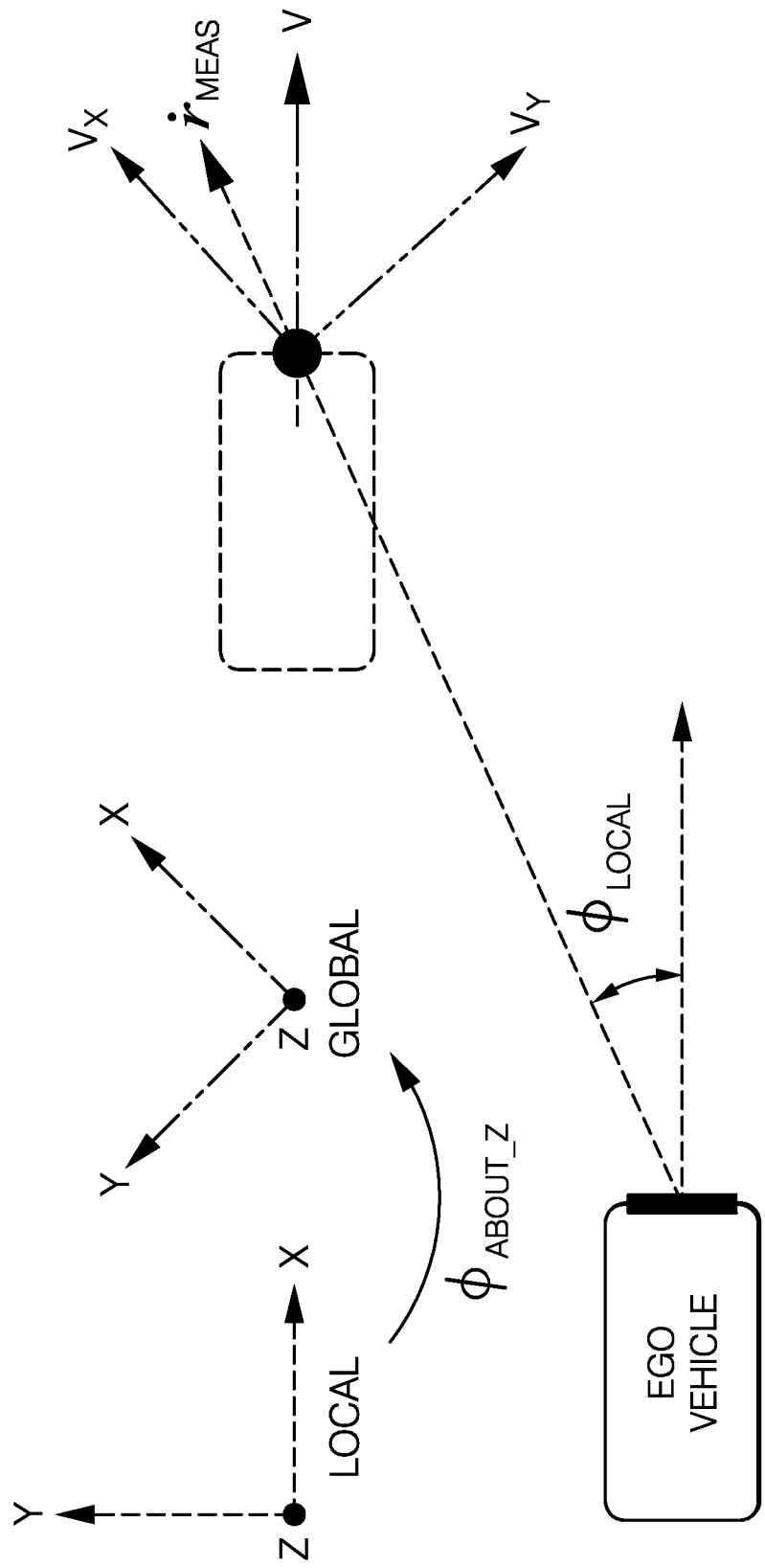
FIG. 14 illustrates how the velocity and bearing of a return point is defined in a global coordinate system, in accordance with one or more embodiments.

In Equations [6], $v_{rn}$ refers to the compensated range rate of the $n^{th}$ point in the cluster, $v_x$, $v_y$ correspond to the velocity components along the X- and Y-axes of the cluster in the global reference frame, and $\phi_n$ refers to the bearing of the $n^{th}$ point in the cluster in the global reference frame, as illustrated in FIG. 14. The bearing values are provided by the RADAR sensor and are in the local RADAR sensor reference frame and they can be converted to the global reference frame by querying the pose of the sensor in the global reference frame and adding the rotation between the RADAR sensor and the global reference frame about the vertical axis to the bearing. Mathematically, the relation is shown in Equation [7]:

$$\phi_{global} = \phi_{local} + \phi_{about\_z}, \qquad [7]$$

where $\phi_{about\_z}$ refers to the angle between the sensor and the global reference frame about the vertical (Z) axis.

In an embodiment, the compensated range rate needed for estimating the cluster velocity is computed by first computing the range rate of ego-vehicle as experienced by the RADAR sensor and then adding the measured range rate as shown in Equation [10]. The range rate of the ego-vehicle is in-turn estimated by first computing the motion at the RADAR sensor using the known velocity of the ego-vehicle, and then projecting the known velocity onto a line joining the RADAR sensor and reflection point as described in Equations [8] and [9]:

$$\begin{bmatrix} \omega_S \\ v_x^S \\ v_y^S \end{bmatrix} = \begin{bmatrix} 1 & 0 & 0 \\ -(y^S - y^E) & 1 & 0 \\ (x^S - x^E) & 0 & 1 \end{bmatrix} \begin{bmatrix} \omega_E \\ v_x^E \\ v_y^E \end{bmatrix}, \quad [8]$$

$$\dot{r}_E = v_x^S \cos(\phi + \alpha_S) + v_y^S \sin(\phi + \alpha_S), \quad [9]$$

$$\dot{r}_{comp} = \dot{r}_{meas} + \dot{r}_E. \quad [10]$$

Here, $v_x^S$, $v_y^S$ and $\omega_S$ represent the computed motion as experienced by the RADAR sensor, $x^S$, $y^S$ and $x^E$, $y^E$ denote the position of the ego-vehicle respectively, $v_x^E$, $v_y^E$ and $\omega_E$ represent the known motion of the ego-vehicle, $\dot{r}_E$, $\dot{r}_{meas}$, and $\dot{r}_{comp}$ denote the ego-vehicle, measured and compensated range rate respectively, and $\phi$ and $\alpha_s$ represent the bearing of the return point w.r.t. the RADAR sensor and angle of the RADAR sensor w.r.t. the vehicle respectively.

The system of linear Equations [6] can be solved when there are more than two distinct points in the cluster. The challenge, however, arises from the fact that the radar measurements are very noisy and using Equations [6] and [7] would result in incorrect velocity estimates. In an embodiment, the velocity of the cluster is computed using a least-squares approach. This approach minimizes the squared error to compute the most optimal solution. This approach, however, is sensitive to outliers and noise in the point cloud, and can give wrong results even in the presence of a single outlier. Since the input data is very noisy and has a lot of reflections off (e.g., the wheel-wells and other random places of the AV), this approach may provide inaccurate cluster velocity estimates. On the plus side, however, the least-squares approach is fast, consumes all the points at once and guarantees the same output every time the same set of points were provided as input.

To remove the outlier points from the cluster, in an embodiment a RANSAC-based approach can be used. The RANSAC algorithm works by randomly selecting two points from the cluster and solving the linear system of Equations [4] using the two points. The projected error is then computed for all points in the cluster and the points are classified as inliers or outliers. The projected error is determined by computing the estimated range rate of the point given $v_x$ and $v_y$, and then computing the difference between the estimated and true range rates, which is represented mathematically by Equations [11] and [12].

$$\hat{v}_r = \hat{v}_x \cos\phi + \hat{v}_y \sin\phi, \quad [11]$$

$$\text{Error}(\varepsilon) = |v_r - \hat{v}_r| \quad [12]$$

where $\hat{v}_r$ is the estimated range rate, $\hat{v}_x$ and $\hat{v}_y$ are the estimated velocity components of the cluster, $\phi$ is the bearing of the point in the global reference frame as measured by the RADAR sensor, and $v_r$ is the range rate of the point as measured by the RADAR sensor. A point is considered to be an inlier if its error is less than a pre-defined threshold. This entire process is repeated multiple times and the iteration that has the largest number of inliers is used to compute the final estimated velocity. The final estimated velocity is then computed by using the least-squares approach on the set of inliers.

The RANSAC algorithm is used only to differentiate the outliers from the set of inliers which is then followed by the least squares algorithm to compute the actual velocity of the cluster. RANSAC usually works well when there are a lot of points with most of them being inliers, but in our case the number of points per cluster is very small and it often happens that the number of outliers is comparable to the number of inliers. Further, because the least squares algorithm is run multiple times (once each iteration) the RANSAC algorithm is computationally expensive to perform.

In an embodiment, an RLS filter is used to estimate cluster velocity. The RLS filter is an adaptive filter that recursively updates the parameters to minimize the weighted least squares cost function as compares to ordinary least squares (OLS) that finds the mean least-squares solution. The RLS algorithm starts with initial estimates of the velocities and the associated covariance which are then updated every time a new point from the cluster enters the filter. The RLS filter converges quickly and is fast because it is recursive and does not need to re-compute the velocity using all the points in the cluster at every iteration (the state vector captures information from all the points seen till then). The RLS update Equations [13] and [14] are given by:

$$\hat{V}(n) = \hat{V}(n-1) + \frac{P_{n-1}\phi(n)}{1 + \phi^T(n)P_{n-1}\phi(n)}\left(y(n) - \phi^T(n)\hat{V}(n-1)\right), \quad [13]$$

$$P_n = P_{n-1} - \frac{P_{n-1}\phi(n)\phi^T(n)P_{n-1}}{1 + \phi^T(n)P_{n-1}\phi(n)}. \quad [14]$$

In Equations [13] and [14], $\hat{V}$ is a vector containing the estimated velocities of the cluster $v_x$ and $v_y$, n is the index of the point in the cluster which ranges from 1 ... N, P is a positive definite matrix which can be thought of as the scaling factor for the parameter update, $\phi(n)$ is a vector containing the $\cos(\phi)$ and $\sin(\phi)$ values for the $n^{th}$ point in the cluster, and y(n) is the measured range rate value for the $n^{th}$ point in the cluster. The RLS filter is initialized using one of three methods: zero initialization, initialization from two random points in the cluster and initialization from cluster accumulation history.

Zero Initialization

In an embodiment, $\hat{V}(0)$ is initialized to 0 and $P_0$ to an identity matrix multiplied by a scaling factor. This initialization works well when the number of data points is large (usually a time-based data stream) giving enough iterations for the RLS filter to converge to the true value. It was observed, however, that the RLS filter did not converge to the true value in cases where the number of points is too small, one velocity component dominated the other velocity component and large outliers in the data pulled the filter away from the true value.

Another major source of error, not specific to zero initialization, is the large outliers in the cluster. Outliers are points that reflect off tires, wheel-wells and other parts of the vehicles that are moving much slower/faster as compared to the vehicle itself. If not accounted for, such points can cause the filter to converge to incorrect values. Since it is not possible to directly determine which point is an outlier measurement and which is not, in an embodiment the RLS filter update step is used to classify the points and exclude the classified outliers from further processing.

After the first N (e.g., 3) steps (empirically observed to be the number of points needed for the filter to converge to stable-enough estimate), if an update step changes the velocity components of $v_x$ or $v_y$ by an amount larger than a pre-defined threshold, then the point that made the update is classified as an outlier and is excluded from further processing. To handle the case when the outliers make the first three updates resulting in all other correct measurements being classified as outliers, an ensemble of RLS filters (e.g., 10 RLS filters) are initialized with each filter receiving a randomized order of data points, as described in further detail with reference to FIG. 15. Randomizing the input order ensures that not all filters converge to the incorrect value. The filter whose $v_x$ and $v_y$ estimates result in the least reprojection error is chosen and its velocity estimate is considered to be the velocity of the cluster.

Initialization from Two Random Points

To solve the problems with zero initialization, instead of starting the RLS filter with 0 and having it iterate to its true value, the filter is initialized close to its final value and allowing it to refine the final value to the true estimate. One approach to initializing the velocity estimate close to its final value is to randomly choose two points from the cluster and solve the system of linear equations using the two points. It can sometimes happen that an outlier is picked and the initial velocity estimate is far from the true value, but this is largely mitigated by either initializing the N RLS filters using different pairs of data points, or by accepting an initial value only when the norm of the initial velocity estimate is within some predefined threshold (outliers usually result in very large velocity estimate norms).

Such an approach improves the performance of the velocity estimate but the approach suffers because it reuses information from the cluster and no new information is learned in the process (the initialization and the filter use the same set of points). Further, when the number of points in the cluster is small, the filter does not have enough points left of itself and my end up stagnating at the initial value.

Initialization from Cluster Accumulation History

In an embodiment, information from the cluster history is used to initialize the RLS filter. A previously noted, points from multiple time-steps/frames are accumulated to increase the density of the RADAR point cloud. This point cloud accumulation can be exploited and the initial velocity for the filter can be estimated by computing the change in position of the cluster center between the earliest and latest time-steps/frames with points within the accumulation divided by the time elapsed between the time-steps/frames. The cluster center at a given time-step/frame is assumed to be the mean of all the points present in that cluster at that time-step/frame.

One key advantage of this approach is that it does not use the error-prone range rate measurements of the points but instead only uses the more reliable position estimates from the RADAR sensor. This alleviates most of the issues caused by outliers which are predominantly present only in the range rate measurements of the RADAR sensor. However, problems with initialization may still exist because returns from the same location on the object are not obtained in all the time-steps/frames which might over or under estimate the initial velocity estimate. For instance, if the first time-step/frame has only one return which happens to come from the front-left of the object and the last time-step/frame has only return from the front-right of the object, the initial velocity estimate has a component in the direction perpendicular to the true heading of the object because of the error induced due to using different points on the object. It was, however, noticed that this error in the initial measurement did not affect the final velocity estimate and most of the filters converged to the true velocity estimate.

Once the velocity of the cluster has been estimated, the innovation between the velocity of the cluster and the predicted velocity of the track is computed. This innovation in conjunction with the innovation between the position estimate and the predicted position of the track is used to determine whether a cluster belongs to a track or not.

IV. Cluster-Track Association and Track Management

Once the cluster-track association is completed, the tracks and clusters are handled in three separate ways based on whether a cluster is associated with a track, not associated with a track or a track is not associated with a cluster.

Cluster Associated to a Track and Track Updated

When the innovations of both the position and velocity of the cluster fall below a pre-defined threshold, the cluster is associated to a track with the least innovation sum. Two or more clusters can be associated to the same track, so the first step is to assimilate points from all the clusters associated to the same track (1308). Assimilation of points includes grouping all the points together and recomputing the parameters like position, velocity and extents of the larger cluster.

In an embodiment, the state of the track is maintained using a 6-D vector that keeps track of its position, velocity and dimensions. Mathematically, the state can be represented as $[x, y, v_x, v_y, l, w]$ where x and y represent the position in the X-Y plane, $v_x$ and $v_y$ denote the velocity components and/and w represent the length and width of the track. The track is maintained using a Kalman Filter. In an embodiment, a Linear Kalman Filter (LKF) is used. In other embodiments where constant velocity motion model is not used, an Unscented Kalman Filter (UKF) or extended Kalman Filter (EKF) is used to handle non-linearity in the system. In a preferred embodiment, the LKF employs a constant velocity motion model for prediction. An LKF can be used because the velocity estimates are accurate enough to directly update the state without introducing any non-linearity into the system. By using an LKF as there is no non-linearity in the system. The velocity estimates are accurate enough to directly update the state without the need to introduce any non-linearity into the system. When new measurements are associated to a track, the state of the track is updated using the LKF update step (1311). The update equations of the LKF are well-known and need not be described herein. If a track is associated to a cluster multiple times (1314), the track status is set to UPDATED. Otherwise, there is no change to the track status (1313).

In an embodiment, the state vector of the LFK can include additional state parameters to be estimated, including but not limited to sensor bias and drift error.

Cluster Not Associated to Any Track

When a cluster is not associated to any track, a new track is created with all the state parameters initialized using the corresponding parameters of the cluster (1309). Because most of the observed objects are AVs, the length and width of the track are instantiated to 4 meters and 2 meters, respectively. This new track is initialized with a track status set to NEW (1312) and remains invalid until the track has been associated to a cluster multiple iterations (e.g., 3 iterations). This is to prevent noise and other random reflections from creating tracks that can affect the final output of the RADAR tracker.

Track Not Associated to Any Cluster

When an existing track has not been associated to any cluster, the track status is changed from either NEW or UPDATED to COASTING (1310). The track was already propagated before the cluster-track association phase, so no additional computation needs to be performed. When the same track has not been associated to any cluster for multiple consecutive iterations (e.g., 6 iterations) the track is deemed to be stale, its status is changed to INVALID, and the track is terminated (e.g., deleted from memory).

Figure 15:
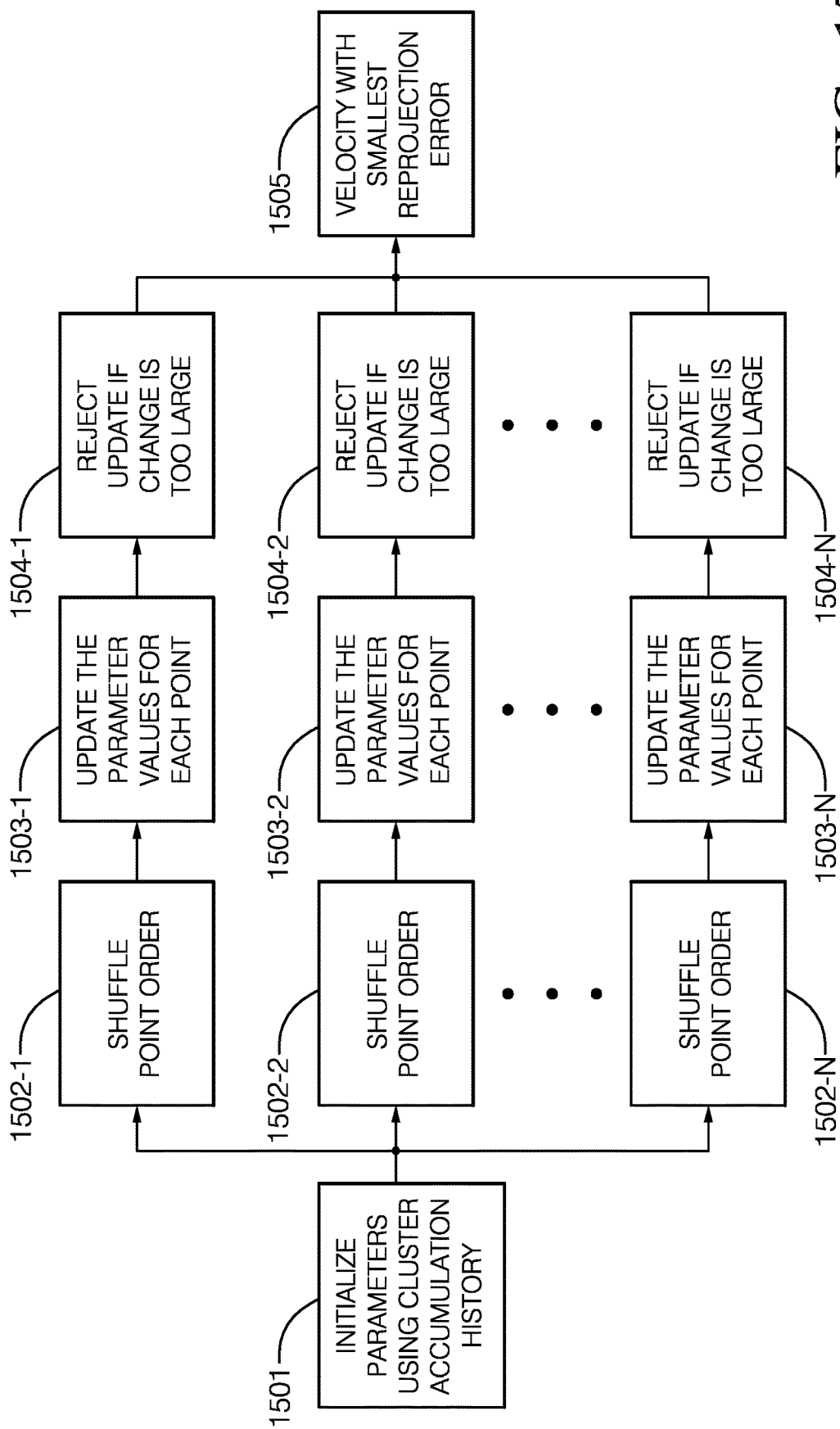
FIG. 15 is a block diagram illustrating cluster velocity estimation using an ensemble of Recursive Least Squares (RLS) filters, in accordance with one or more embodiments.

FIG. 15 is a flow diagram of a cluster velocity estimation process 1500, in accordance with one or more embodiments. As previously stated, to handle the case when outliers make the first three updates resulting in all other correct measurements being classified as outliers, an ensemble of RLS filters are used. 1 . . . N (e.g., 10 RLS filters).

Process 1500 begins by initializing parameters (e.g., $\hat{V}$, $P_0$) of an ensemble of RLS filters 1 . . . N 1501. In an embodiment, the velocity of each RLS filter is initialized using the velocity calculated from the cluster accumulation history, which is obtained by estimating how much the return points have moved divided by the time difference between the time-steps or frames. Also, the return points in the clusters are shuffled to be in different random orders to update the ensemble of RLS filters.

For each RLS filter, the point order is shuffled (1502-1, 1502-2 . . . 1502-N), the parameter values for each point are updated (1503-1, 1503-2 . . . 1503-N), the update for each point is rejected if the change to the parameters after the update is too large (1504-1, 1504-2 . . . 1504-N). The filter whose $v_x$ and $v_y$ estimates result in the least reprojection error is chosen and its velocity estimate is considered to be the velocity of the cluster (1505).

Figure 16C:
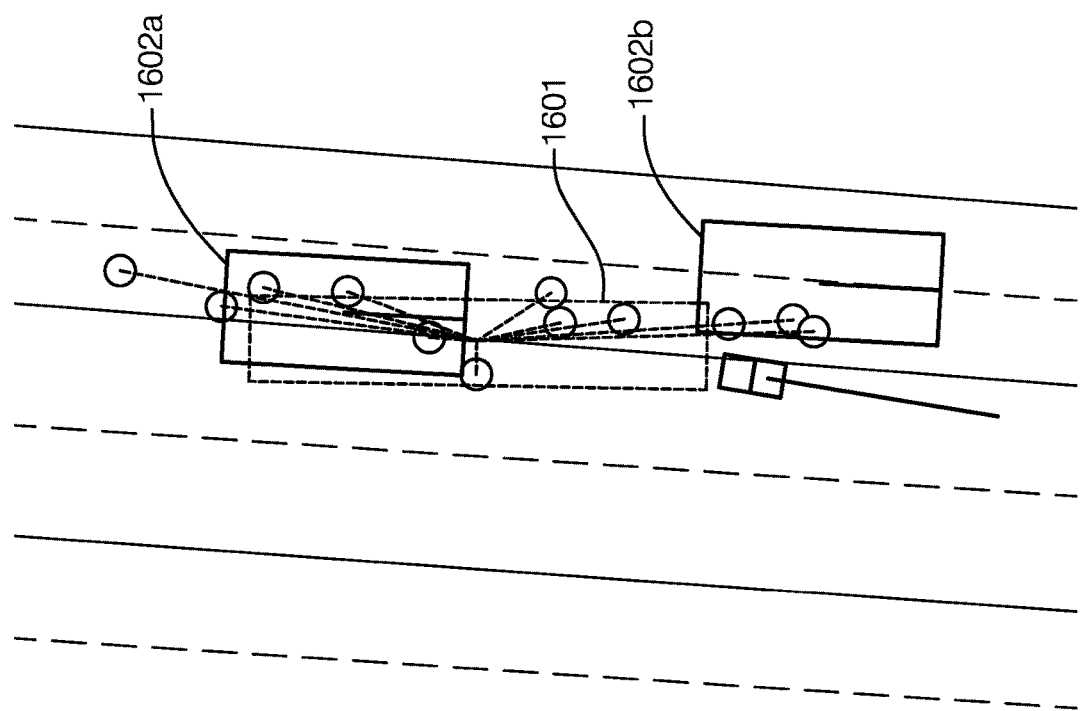
FIGS. 16A-16C illustrate bounding boxes produced using extended object tracking using RADAR, in accordance with one or more embodiments.
Figure 16A:
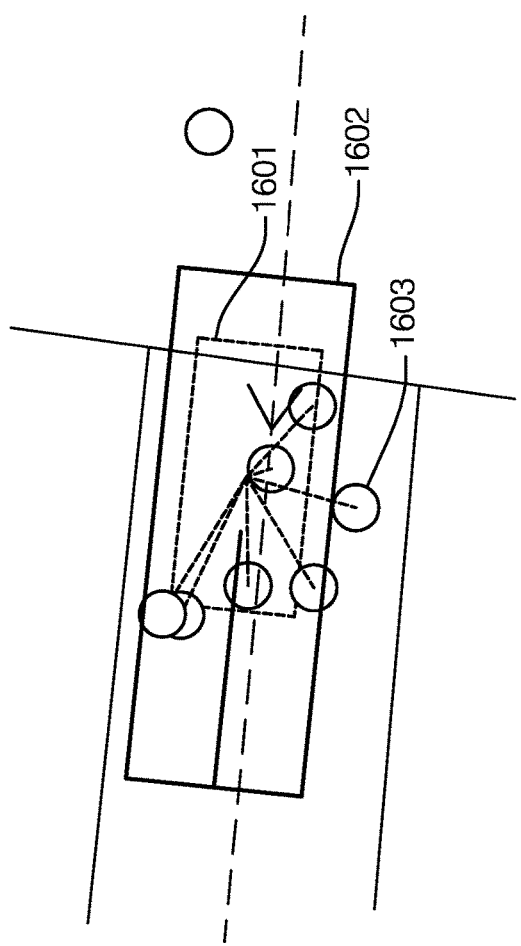
Figure 16B:
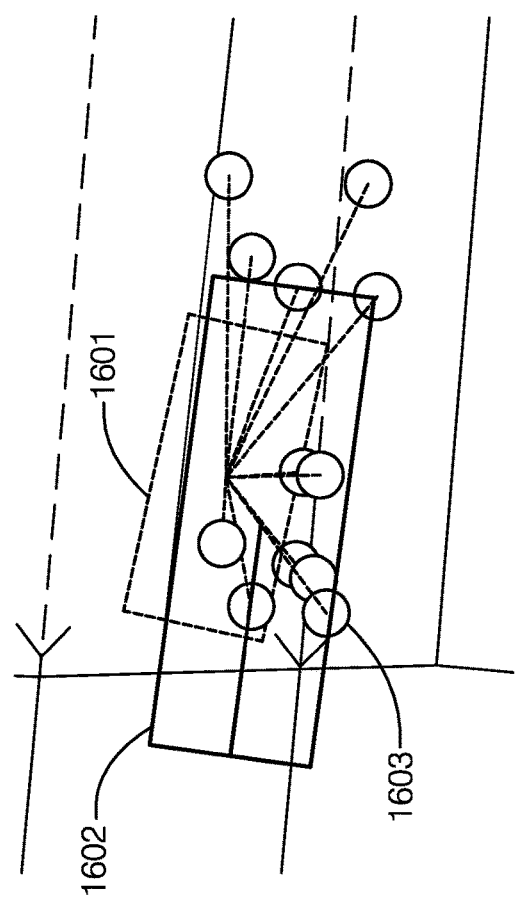

FIGS. 16A-16C illustrate bounding boxes produced using extended object tracking using RADAR, in accordance with one or more embodiments. Referring to FIGS. 16A and 16B, EOT bounding box 1601 is correctly tracking points 1602 of a turning object (e.g., a vehicle changing lanes) in contrast to the non-EOT bounding box 1602, which is incorrectly tracking the object as traveling straight. Also note that EOT bounding box 1601 more accurately measures the length and width of the object than non-EOT bounding box 1602. Referring to FIG. 16C, EOT bounding box 1601 is correctly tracking a single extended object (e.g., a long truck or bus) by combining two clusters, in contrast to non-EOT bounding boxes 1602a, 1602b that are incorrectly tracking the same two clusters as different objects.

Thus, as shown in FIGS. 16A-16C, the disclosed EOT embodiments provide accurate computation of the extents (length and width) of the objects in addition to their position and velocity, achieve better tracking for long objects like trucks and buses that may be associated with multiple clusters, achieve better tracking of objects that are turning, and have reduced reliance on the accuracy of the clustering algorithm.

Figure 17:
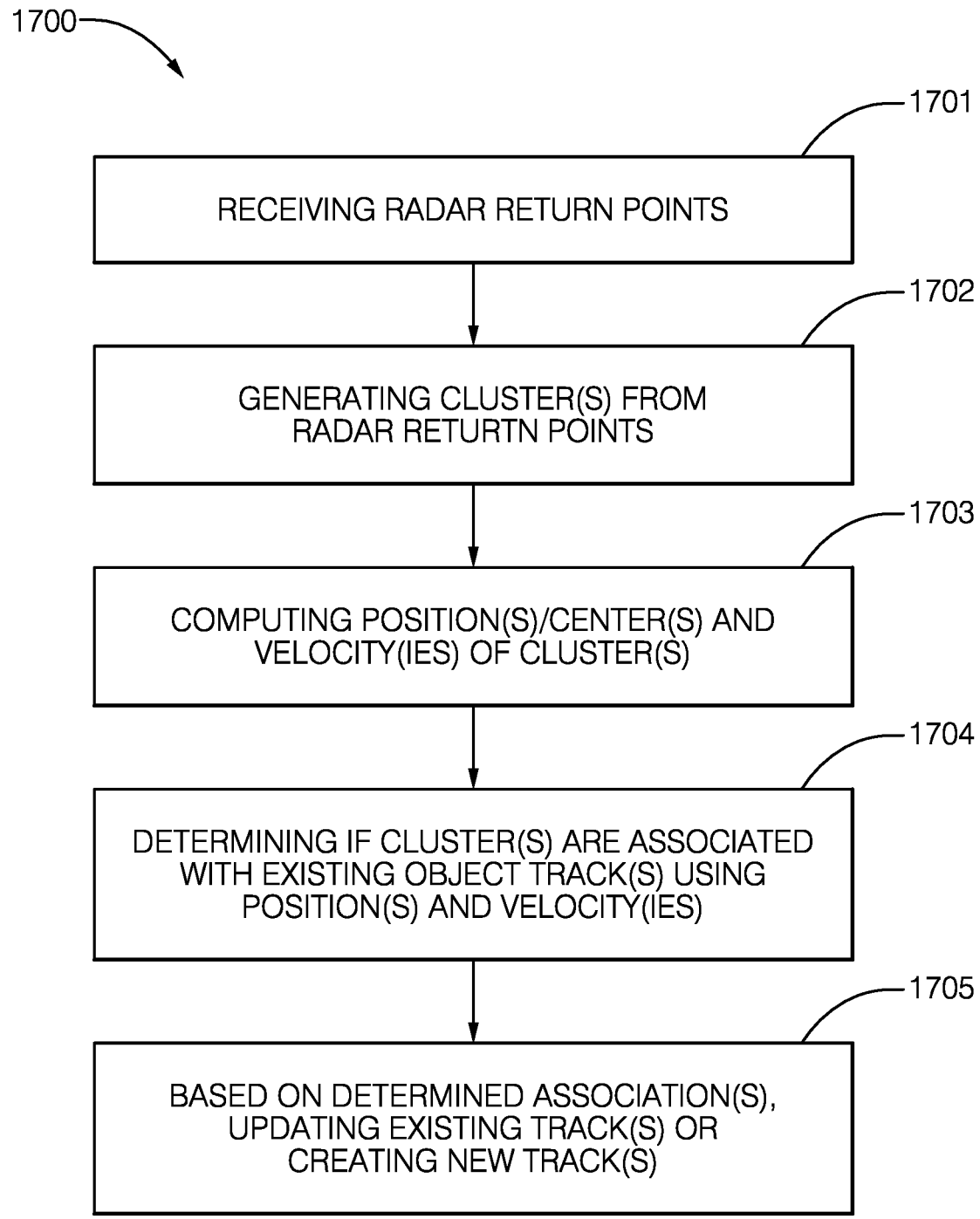
FIG. 17 is a flow diagram of a process for extended object tracking using RADAR return points only, in accordance with one or more embodiments.

FIG. 17 is a flow diagram of process 1700 for extended object tracking using RADAR return points only, in accordance with one or more embodiments.

Process 1700 begins by receiving, using one or more computer processors of a vehicle, return points from RADAR transmissions of at least one RADAR sensor of the vehicle (1701), and generating, using the one or more computer processors, one or more clusters of the return points (1702). For example, clusters may be generated using a density-based clustering algorithm, such as DBSCAN that is modified to use elliptical regions a major axis in the direction of traffic flow to grow clusters.

Process 1700 continues by computing, using the one or more computer processors, an estimated position and velocity of each of the one or more clusters (1703). For example, an ensemble of RLS filters can be used to estimate cluster velocity, as described in detail in reference to FIGS. 15 and 18. The filters can be initialized as described in reference to FIGS. 15 and 18.

Process 1700 continues by determining, using the one or more processors, if one or more clusters are associated to an existing object track (1704). For example, the clusters can be associated with existing object tracks using innovations of position and velocity, as described in reference to FIG. 13A.

Process 1700 continues by updating the existing object track using the respective positions and estimated velocities of the one or more clusters associated to the existing object track, if the one or more clusters being associated to an existing object track. For example, an LKF is used to maintain and update existing object tracks using the cluster position and estimated cluster velocity.

Figure 18:
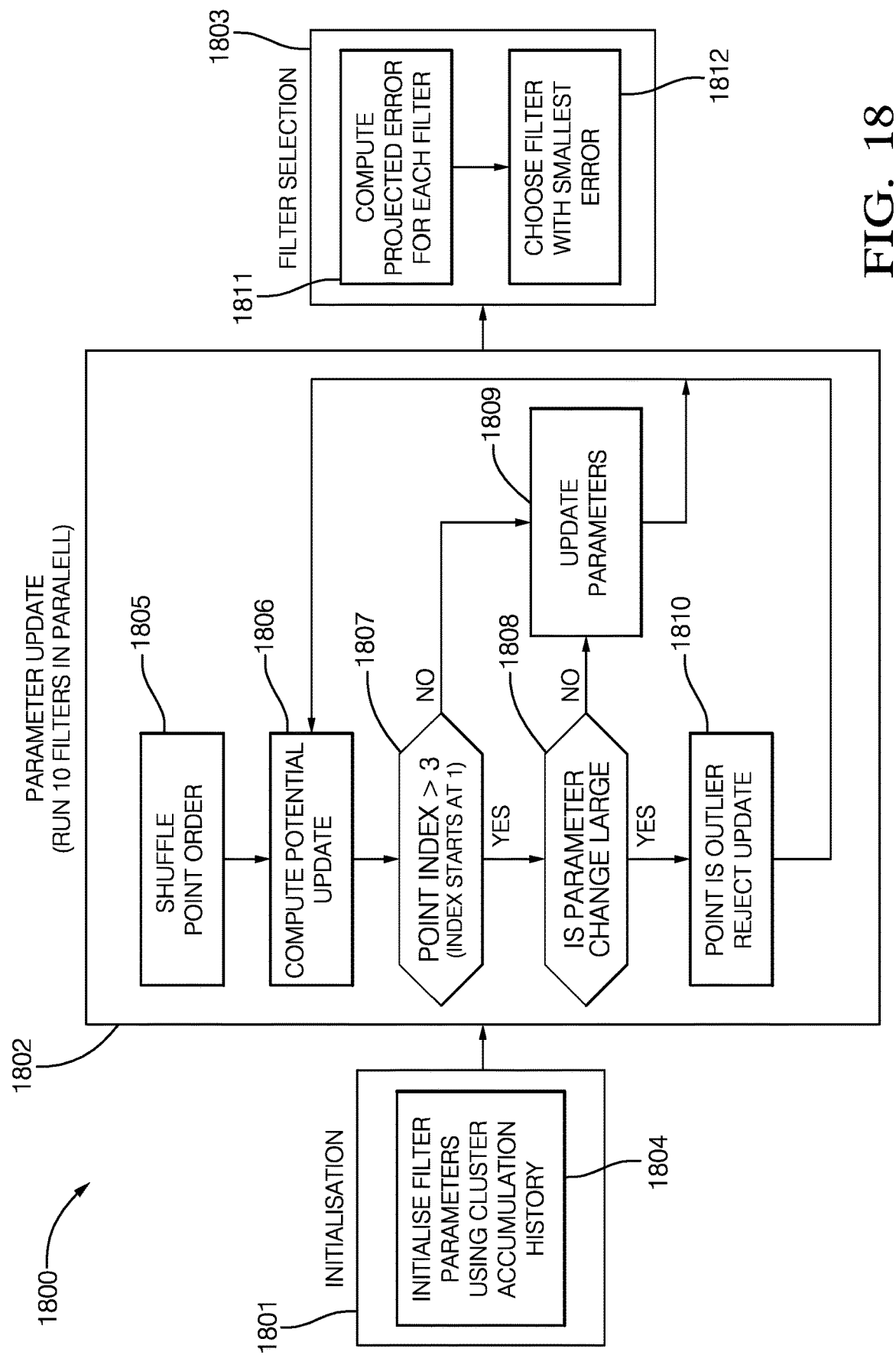
FIG. 18 is a flow diagram of a process to compute the instantaneous velocity of a cluster, in accordance with one or more embodiments.

FIG. 18 is a flow diagram of a process 1800 to compute the instantaneous velocity of a cluster, in accordance with one or more embodiments. Process 1800 includes three stages: initialization 1801, parameter update 1802 and filter selection 1803. In the initialization stage 1801, the RLS filter parameters are initialized using track history (1804).

In the parameter update stage 1802, the point order is shuffled (1804) and potential update parameters are computed (1806). If a point index is greater than N (e.g., 3) (1807), and the parameter change is greater than a predefined threshold value (1808), the return point is deemed an outlier and rejected from further processing (1810). If the point index is less than or equal to N (1807), the filter parameters are updated (1809).

In the filter selection stage 1803, the reprojected error is computed for each filter (1811), and the filter with the smallest reprojection error is determined (1812). The estimated velocity of the filter with the smallest re-projection error is used as the estimated velocity for the cluster in subsequent processing.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:
1. A method comprising:
  receiving, using one or more processors of a vehicle, return points from at least one RADAR sensor of the vehicle;
  generating, using the one or more processors, one or more clusters based on the return points;

computing, using the one or more processors, an estimated position and a velocity of each of the one or more clusters;

computing, using the one or more processors, a length, a width, and a center of each cluster, wherein return points belonging to a respective cluster are concentrated at the center of the respective cluster, and wherein the center of the respective cluster is a geometric center of a rectangular bounding box drawn through extreme return points in the respective cluster;

determining, using the one or more processors, if the one or more clusters are associated with an existing object track; and in accordance with the one or more clusters being associated with the existing object track, updating the existing object track using at least the respective positions of the one or more clusters associated with the existing object track.

2. The method of claim 1, wherein generating the one or more clusters further comprises:

filtering, using the one or more processors, return points to remove return points that have range rates less than a threshold range rate.

3. The method of claim 2, further comprising:

accumulating, using the one or more processors, the filtered return points for multiple RADAR time-steps or frames.

4. The method of claim 1, wherein generating the one or more clusters of the return points comprises clustering the return points using density-based, spatial clustering.

5. The method of claim 4, wherein the density-based, spatial clustering uses an elliptical region around the return points to expand the one or more clusters, and the elliptical region has a major axis that is parallel to traffic flow.

6. The method of claim 1, further comprising:

computing, using the one or more processors, a heading for each of the one or more clusters using the respective velocities of the each of the one or more clusters.

7. The method of claim 6, wherein the length is defined as a maximum distance between the return points in a direction of the heading.

8. The method of claim 6, wherein the width is defined as a maximum distance between the return points that are perpendicular to the heading.

9. The method of claim 1, wherein the returns are aligned to an axis of a global reference frame prior to computing the length, width and center.

10. The method of claim 1, wherein determining if the each one or more clusters are associated with the existing object track using the respective positions and velocities of the each of the one or more cluster further comprises:

computing differences between the respective estimated positions and velocities of the one or more clusters and a predicted position and velocity of the existing object track; and determining if the differences are below respective threshold values for the position and velocity.

11. An apparatus comprising:

one or more processors; and memory storing instructions that when executed by the one or more processors, cause the one or more processors to perform operations comprising:

receiving, using one or more processors of a vehicle, return points from at least one RADAR sensor of the vehicle;

generating, using the one or more processors, one or more clusters based on the return points;

computing, using the one or more processors, an estimated position and a velocity of each of the one or more clusters;

computing, using the one or more processors, a length, a width, and a center of each cluster, wherein return points belonging to a respective cluster are concentrated at the center of the respective cluster, and wherein the center of the respective cluster is a geometric center of a rectangular bounding box drawn through extreme return points in the respective cluster;

determining, using the one or more processors, if the one or more clusters are associated with an existing object track; and in accordance with the one or more clusters being associated with the existing object track, updating the existing object track using at least the respective positions of the one or more clusters associated with the existing object track.

12. The apparatus of claim 11, wherein generating the one or more clusters further comprises:

filtering, using the one or more processors, return points to remove return points that have range rates less than a threshold range rate.

13. The apparatus of claim 12, the operations further comprising:

accumulating, using the one or more processors, the filtered return points for multiple RADAR time-steps or frames.

14. The apparatus of claim 11, wherein generating the one or more clusters of the return points comprises clustering the return points using density-based, spatial clustering.

15. The apparatus of claim 14, wherein the density-based, spatial clustering uses an elliptical region around the return points to expand the one or more clusters, and the elliptical region has a major axis that is parallel to traffic flow.

16. The apparatus of claim 11, the operations further comprising:

computing, using the one or more processors, a heading for each of the one or more clusters using the respective velocities of the each of the one or more clusters.

17. The apparatus of claim 16, wherein the length is defined as a maximum distance between the return points in a direction of the heading.

18. The apparatus of claim 16, wherein the width is defined as a maximum distance between the return points that are perpendicular to the heading.

19. The apparatus of claim 11, wherein the returns are aligned to an axis of a global reference frame prior to computing the length, width and center.

20. The apparatus of claim 11, wherein determining if the each one or more clusters are associated with the existing object track using the respective positions and velocities of the each of the one or more cluster further comprises:

computing differences between the respective estimated positions and velocities of the one or more clusters and a predicted position and velocity of the existing object track; and determining if the differences are below respective threshold values for the position and velocity.

* * * * *